(12) United States Patent
Paranjape et al.

(10) Patent No.: US 8,189,623 B2
(45) Date of Patent: May 29, 2012

(54) DIGITAL FRAMER ARCHITECTURE WITH A FRAMING MARKER

(75) Inventors: Prasad Paranjape, Fremont, CA (US); Tom Wellbaum, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 820 days.

(21) Appl. No.: 12/242,922

(22) Filed: Oct. 1, 2008

(65) Prior Publication Data

US 2010/0080561 A1  Apr. 1, 2010

(51) Int. Cl.
*H04J 3/06* (2006.01)
(52) U.S. Cl. ........................ 370/503; 370/473
(58) Field of Classification Search ............... 370/252, 370/473, 474, 475, 476, 477, 603
See application file for complete search history.

(56) References Cited

U.S. PATENT DOCUMENTS

| | | | |
|---|---|---|---|
| 7,136,487 B1 * | 11/2006 | Schon et al. | 380/229 |
| 7,400,678 B2 * | 7/2008 | Dankworth et al. | 375/240.01 |
| 2008/0151881 A1 * | 6/2008 | Liu et al. | 370/389 |
| 2009/0260041 A1 * | 10/2009 | McGinn et al. | 725/62 |
| 2010/0303279 A1 * | 12/2010 | Tian et al. | 382/100 |

* cited by examiner

*Primary Examiner* — Gary Mui
(74) *Attorney, Agent, or Firm* — Ross M. Carothers; David L. Soltz

(57) ABSTRACT

Embodiments of the present invention provide for diverse routing of a plurality of data streams, representative of a client signal of an unknown format, across multiple communication paths of a digital optical network through the use of a marker embedded in the client signal which is then inserted into the client payload portion of a transport frame. The multiple communication paths include different signal and path attributes related to the optical signals which transport the data streams across the digital optical network, as well as the physical structure of the digital optical network itself, all leading to timing variations in the multiple communication paths. The digital optical network transports the plurality of data streams in the form of wavelength division multiplexed signals, or banded wavelength division multiplexed signals.

20 Claims, 15 Drawing Sheets

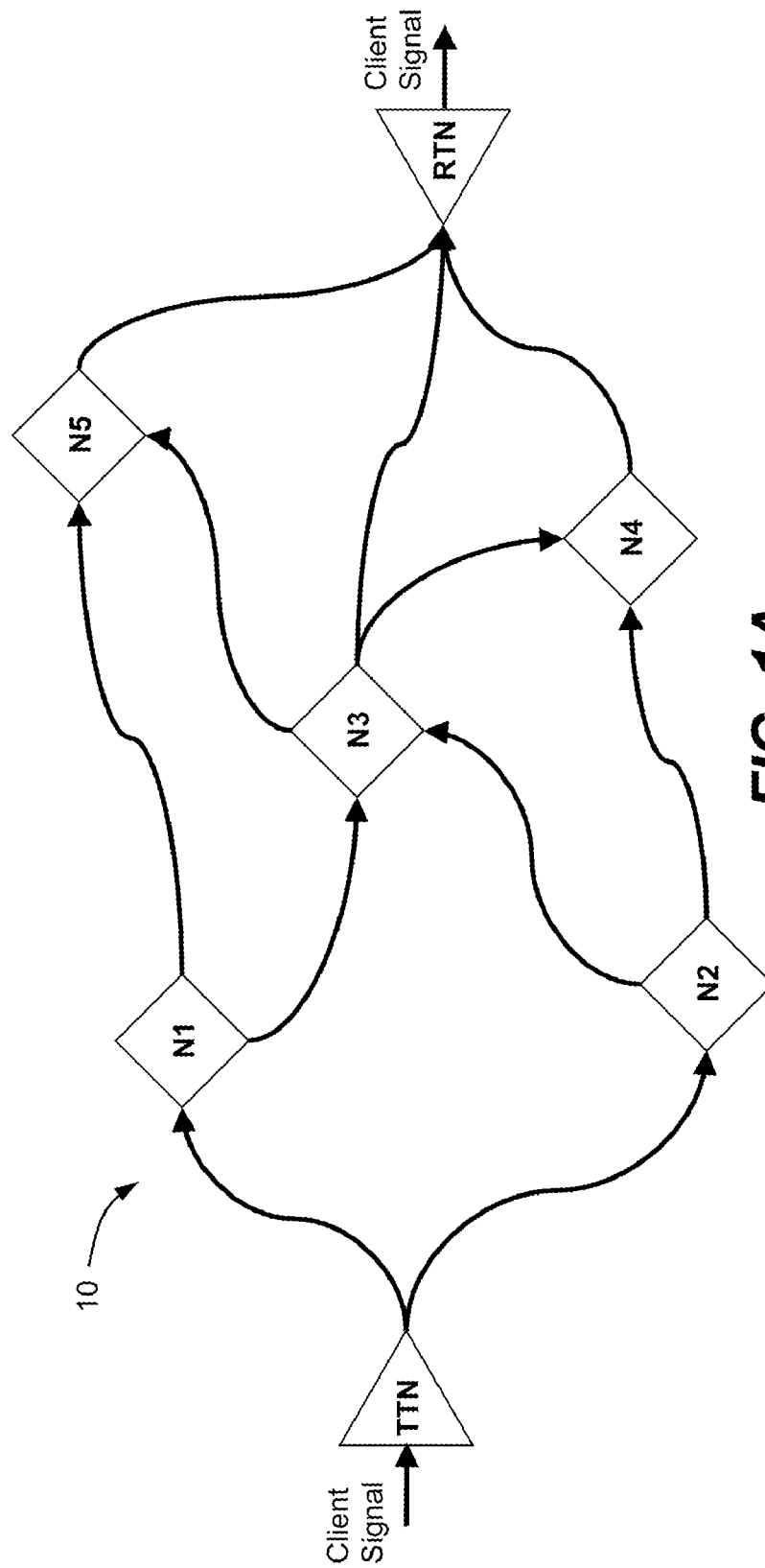
FIG. 1A
FIG. 1B

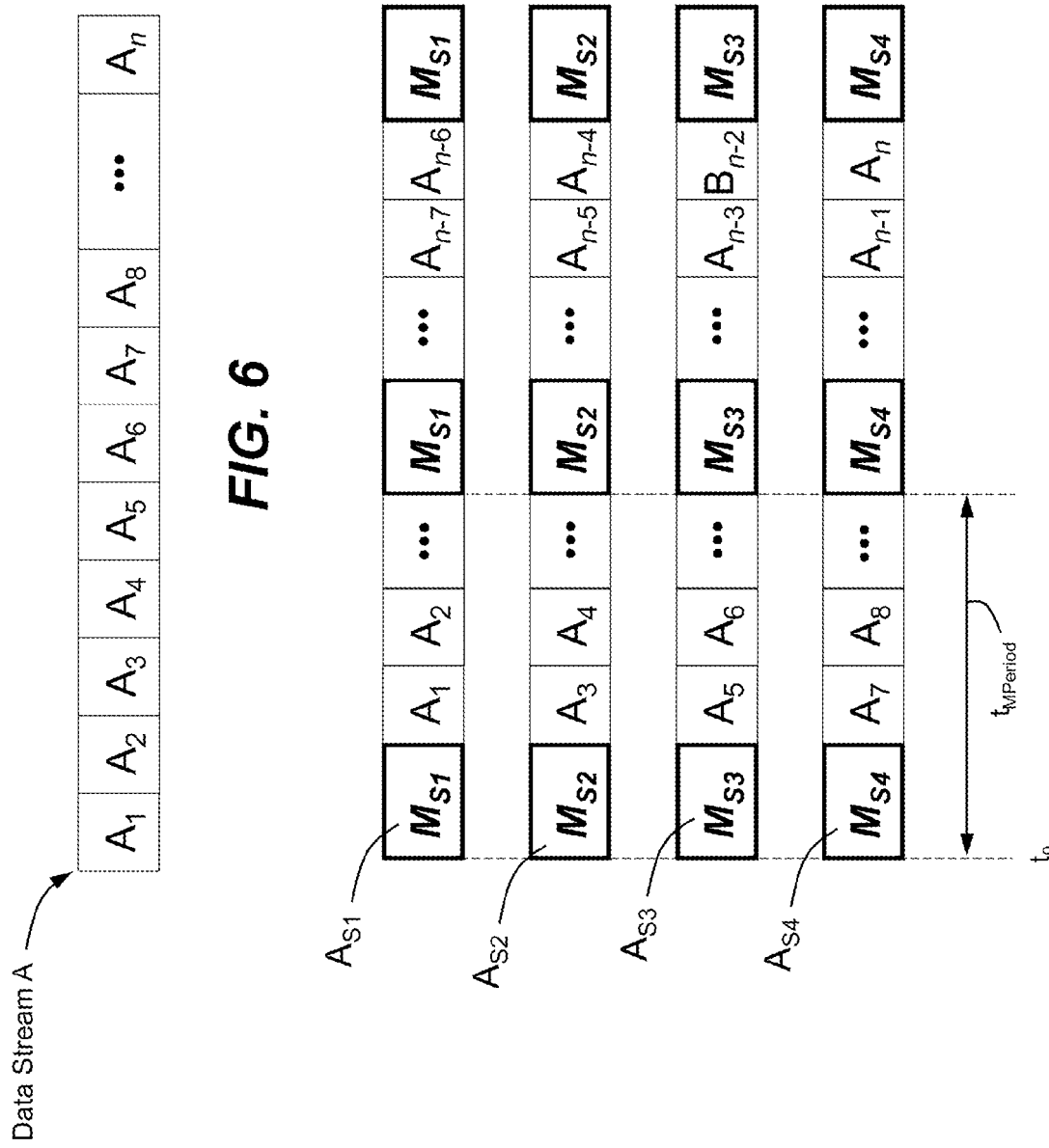

DIGITAL FRAMER ARCHITECTURE WITH A FRAMING MARKER

BACKGROUND OF THE INVENTION

1. Field of the Invention

This invention relates to a network transport system, and more particularly to the transmission of multiple data streams, collectively representative of a client signal, at high rates across a digital optical network infrastructure.

2. Description of the Related Art

Using various optical networking technologies, high capacity transport systems are employed to meet the ever increasing demand of transporting high speed client data across a communication network infrastructure. Certain transport systems have been designed to receive a client signal at a first terminal node or transmit end of the system and re-format the client signal for transmission over the network infrastructure. The re-formatted signal often complies with a transmission standard, such as the Optical Transport Network (hereinafter, "OTN") protocol or other proprietary formats. At a second terminal node or receive end of the network infrastructure, the client signal is obtained from the re-formatted signal and supplied to the client. then received by the client at a second terminal node.

Some transport systems are designed to interface with various types of client networks. In so doing, the transport system maps data from a client signal into a transport frame in which the data propagates across a transport connection. This mapping procedure is typically specific to the protocol of the client signal and the format of the transport system so that the client signal may be completely reconstructed at a transport receiver terminal. The transport terminal nodes, both transmitter and receiver nodes, are generally able to operate in different modes depending on the type of client signal that is being processed. For example, a transport terminal node may map a client Synchronous Optical Network ("SONET") frame into a transport frame using a first mapping procedure or an Ethernet frame into a transport frame using a second mapping procedure.

The transmission characteristics of the client data across the transport connection may depend on both the protocol and rate of the particular client signal. To ensure proper backward compatibility with legacy network schemes and to provide for timing necessary to adequately process the client signal during transmission from transmit end to receive end, some transport systems are designed to include data paths which operate at a fraction of the rate at which the client data was provided. Therefore, if a client signal having a data rate of 10 Gbps, for example, is provided to the transport system, the transport system can then process the incoming signal into multiple signals or data streams, for example four signals each at a rate of 2.5 Gbps. By properly selecting this lower rate, such as 2.5 Gbps, a more efficient transport system can be designed, allowing the transport system to accept and process a client signal regardless of the incoming bit rate or protocol of that signal. In this way, the transport system can retain backward compatibility with legacy networking schemes, while supporting future networking schemes employing faster bit rates and newer protocols. Moreover, at a transmitter node for example, such transport systems may recombine a number of the lower rate data streams for transmission on a specific optical wavelength, as part of a wave division multiplexed (hereinafter, "WDM") signal, across the network infrastructure. Thus, the lower data rate streams can be a fraction of the data capacity per wavelength, as well.

In order to ensure that the client signal is properly recombined at the receiver terminal node, great care must be taken. In some transport systems a client signal is transported across the network infrastructure on a per lambda basis. That is, any given client signal is transported across the network infrastructure, or portion thereof, on a single wavelength, as part of a WDM signal. In this way, the transport system can track the progress of the signal and ensure its proper delivery and processing at a corresponding receiver terminal node.

In such systems, however, the full capacity of the optical carrier may not be fully utilized. For example, in transport systems utilizing 10 Gbps per wavelength transmission systems, if a client signal is received at a rate of 2.5 Gbps, 7.5 Gbps of bandwidth of the transmission system related to that particular wavelength would not be utilized. Additionally, there may another client signal which has a data rate of 7.5 Gbps and, thus, resulting in the underutilization of 2.5 Gbps of bandwidth.

Some transport systems provide for a constant or fixed data rate across the network infrastructure, such as from a transmitter terminal node where a client signal is transmitted to a receiver terminal node where the client signal is provided back to the client. In this way, all the packets or frames which make up the client signal are fixed with respect to size and data rate and, thus, are more easily handled during its transport across the network infrastructure, allowing for a more simple transport system solution since the hardware and software which forms the network infrastructure need only be concerned with the handling of a single type of transport frame. In such systems various smaller transport frames can be combined to form larger transport frames to meet the requirements of the optical transport subsystem. For example, if the digital optical network communicates 10 Gbps per lambda, e.g. per wavelength, then various transport frames of lower rates can be combined until the maximum rate is achieved, such that a larger frame is created which has a data rate substantially equal to 10 Gbps. For purposes herein, these smaller transport frames are referred to as intra-nodal frames since they represent client signal data at a node element as part of the network infrastructure, at a terminal node for example, while the larger transport frames are referred to as line side frames since these frames are utilized for the transmission of data from intermediate node to intermediate node across the network infrastructure.

As the client signal propagates across the network infrastructure within a line side frame format structure, from a transmitter terminal node, through multiple intermediate nodes, and finally reaching a desired receiver terminal node, the client signal may be reconditioned along the way, such as through various electrical or optical signal processing including, but not limited to, FEC encoding, decoding and re-encoding, in addition to signal amplification, signal reshaping and signal retiming, or otherwise regeneration or reconstruction of the signal, typically referred to as "3R" processing. All such processing is performed on the data in the form of intra-nodal frame format structures. Furthermore, although not specifically necessary for carrying out the present invention, some transport systems can freely accept various client signals or varying data rates. Such as those disclosed in, for example, U.S. patent application Ser. No. 11/154,455, entitled "UNIVERSAL DIGITAL FRAMER ARCHITECTURE FOR TRANSPORT OF CLIENT SIGNALS OF ANY CLIENT PAYLOAD AND FORMAT TYPE," which is incorporated in its entirety herein by reference.

What is needed is a transport system which allows for transmission of a client signal across a network infrastructure without the need to transmit the client signal, or the various intra-nodal frames representative of the client signal, on the same wavelength over each optical span of a network infrastructure. Such as a system which is configurable to allow for spreading, or otherwise redirecting, various portions of the various client signals to fully utilize the bandwidth available by the transport system, realigning the data streams at the receiver terminal node and then recapturing the original client signals. Furthermore, what is needed is a transport system which can rearrange and combine various intra-nodal frames into desired line side frames to provide for efficient transmission of client data across the network infrastructure.

Further, what is needed is a transport system which is configurable to allow for selectively generating such desirable line side frames, comprising intra-nodal frames of more than one client signal for example, while taking into account the various problems associated with transmission of such client signals spanning multiple wavelengths, such as skew between or across the various intra-nodal frames representative of a client signal, as it travels from one intermediate node to another across the network infrastructure. Last, what is needed is a transports system which fulfills one or more of the above needs regardless of the format of the client signal as provided by the client for deployment on the network infrastructure.

SUMMARY OF THE INVENTION

According to this disclosure, embodiments of the present invention include a transport system having a transmitter terminal node including a deinterleaver which accepts a client signal, regardless of the specific format of the client signal, standard or proprietary, and reformats the client signal into a plurality of data streams, each having a fixed or known frame format for transmission of the client signal across a network infrastructure. The transmitter terminal node further including a framer to embed a corresponding data marker, or a bit pattern, into the client payload section of each of the plurality of data streams, and encapsulate the data streams into transport frames for deployment across a digital optical network. The transport system then redirects each of the transport frames including the plurality of data streams, which make up the client signal, to a receiver terminal node which utilizes the embedded data markers to then realign the individual data streams in the time domain so that the client signal can be finally extracted.

In other embodiments of the present invention, the receiver terminal node includes a demapping circuit which receives the respective transport frames and demaps them into the corresponding data streams, the data markers present in the data streams being utilized to subsequently align the data streams in the time domain.

In still further embodiments of the present invention, the marker is periodically embedded in the corresponding data stream at a known time interval. Thus, during the alignment process of the data streams at the receiver terminal node, each of the periodic markers within each corresponding data stream are aligned with the remaining periodic markers of the remaining data streams. Once aligned in the time domain, the payload data is obtained and recombined to form the client signal. The embedded periodic data marker may include a data field which contains an incremental value relative to adjacent markers within the corresponding data stream to compensate for greater amounts of skew with respect to the plurality of data streams which define the client signal.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings where like reference symbols refer to like parts or elements:

FIG. 1A is a high level schematic view of a digital optical transmission network.

FIG. 1B is a simplified depiction of a client signal transported across the digital optical transmission network of FIG. 1A.

FIG. 6 is an exemplary depiction of a data stream representing a client signal.

FIG. 7 is an exemplary depiction of four data streams relative to the time domain, corresponding to the data stream of FIG. 6 at a transmitter terminal node, in accordance with various aspects of the present invention.

DETAILED DESCRIPTION OF THE INVENTION

As will become apparent to one of ordinary skill in the art in light of the further discussion below, utilization of intra-nodal frames, along with corresponding markers embedded in the client payloads therein, as disclosed herein, allows for the deployment of a client signal across a network infrastructure regardless of the specific format in which the client signal was originally provided, the data rate and structure of the client side frame encapsulating the provided client signal for example. In this way, the present invention can accommodate any client signal data format, standard or proprietary, whether presently existing or developed in the future.

Referring now to FIG. 1A, a general digital optical network topology will be discussed. While depicted as being unidirectional for clarity, digital optical networks, such as network 10, are of course typically bidirectional in functionality. As shown, the optical network 10 generally comprises a transmitter terminal node TTN, a receiver terminal node RTN, and a plurality of intermediate nodes depicted as nodes or node elements N1-N5. The transmitter terminal node TTN interfaces with a client signal and formats the client signal for transmission across the digital optical network 10 by, for example, encapsulating the client data into a line side transport frame. Once formatted, the transmitter terminal node deploys the line side transport frame with the client signal onto the digital optical network, for example transmitting the client signal, or a portion thereof, to one or both of the intermediate nodes N1 and N2. The line side transport frame, along with the encapsulated client signal, is then transmitted from node to node until the transport frame is finally received at the receiver terminal node RTN. From the perspective of the client, the client signal is simply transmitted from the client transmitter terminal node TTN and received at the client receiver terminal node RTN, regardless of the data rate or type as defined by one of multiple network protocols, as depicted in FIG. 1B. One such digital optical network which may be employed in accordance with the present invention is described in U.S. Pat. No. 7,295,783, entitled "DIGITAL OPTICAL NETWORK ARCHITECTURE," issued Nov. 13, 2007, the contents of which is incorporated herein in its entirety by reference.

Figure 2:
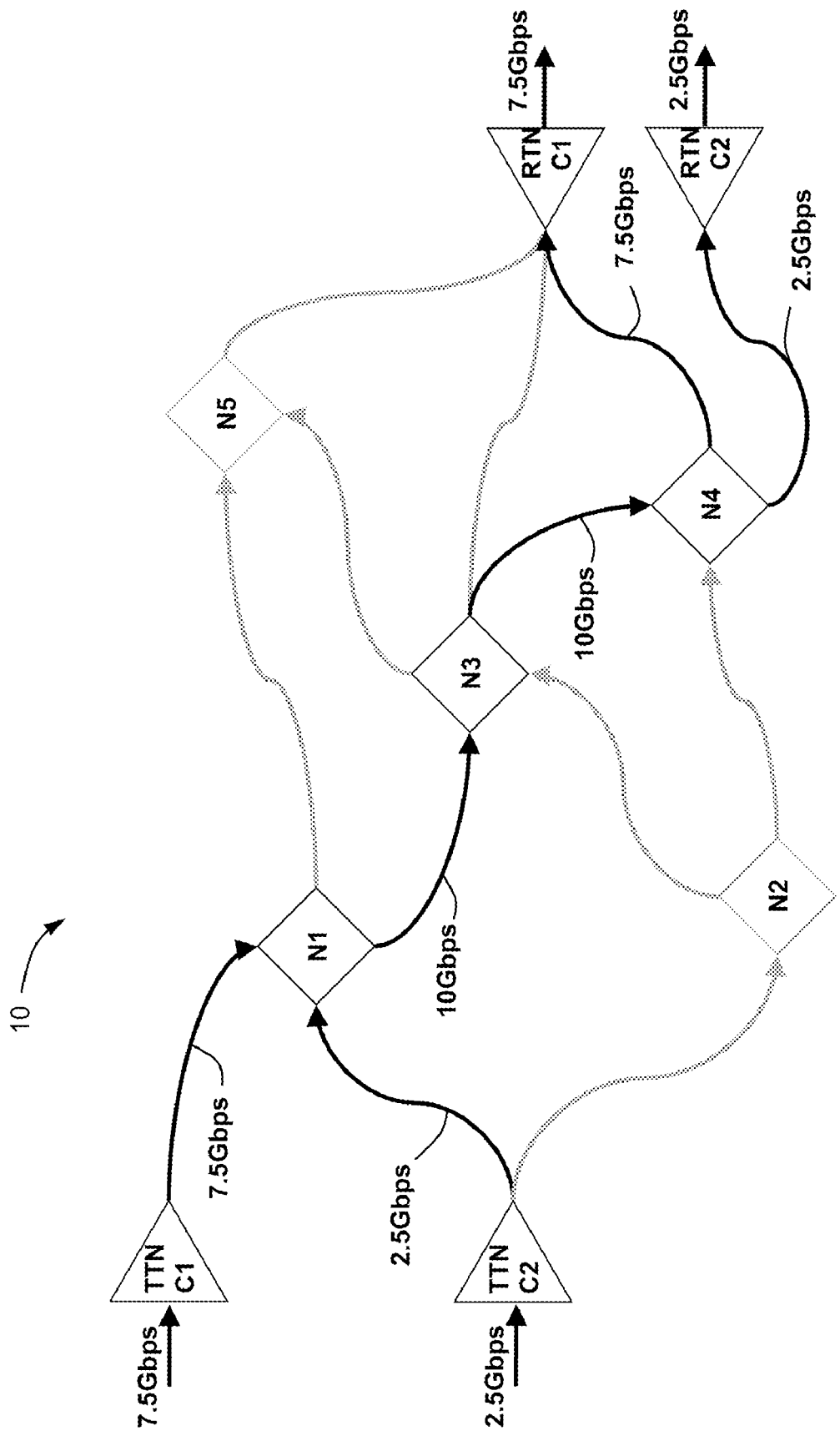
FIG. 2 is a high level schematic view of an optical transmission network, wherein a specific nodal path across the network infrastructure is depicted.

Now turning to FIG. 2, a more detailed discussion of the network transport will be discussed. As depicted in FIG. 2, two separate clients are utilizing the optical network 10 for transmission of certain client data. In particular, a first transmitter terminal node TTN1 receives a first client signal, the first client signal having a data rate of 7.5 Gbps, and a second transmitter terminal node TTN2 receives a second client signal, the second client signal having a data rate of 2.5 Gbps. While not necessarily the case, FIG. 2 depicts the various client signals following a signal path from deployment to destination for clarity. In accordance with the present invention such client signals can each take multiple paths, as will be more readily understood in the discussion further below.

As mentioned above, transport systems in accordance with the present invention utilize multiple data paths between each node of a digital optical network, such as network 10. Such transport systems, for example, utilize a WDM system where data is multiplexed onto an optical signal of a particular wavelength, and then combined with multiple other optical signals, each having unique wavelengths, to form a WDM output signal for transmission across a network infrastructure. The WDM system is designed to provide for a specific capacity per wavelength. In other words, each of the individual and unique wavelengths which comprise the WDM optical output signal has a per wavelength data carrying capacity. While the per wavelength capacity across each link or span between each node of network 10 can vary and be of a much higher capacity, for sake of this discussion, each communication link between each node of digital optical network 10 has the capacity to carry 10 Gbps per wavelength. Therefore, while the 7.5 Gbps client signal is transmitted from the transmitter terminal node TTN1 to intermediate node N1, 2.5 Gbps bandwidth is lost, or otherwise unused. Likewise, transmission of the 2.5 Gbps clients signal from TTN2 to intermediate node N1 results in lost bandwidth of 7.5 Gbps. In accordance with the present invention, such bandwidth losses can be recovered by merging the two client data streams into one 10 Gbps stream on a single wavelength, utilizing only one 10 Gbps stream while passing from intermediate node N1 to intermediate node N2 for example. As one of ordinary skill in the art should be aware, utilizing one wavelength having a 10 Gbps capacity rather than two 10 Gbps data streams has at least two advantages: First, overall efficiency of the transport system is increased by recapturing lost bandwidth per wavelength and, second, efficiency of the transport system is further increased through the availability of additional wavelength capacity between intermediate nodes N1-N5, offering more diverse routing of traffic for example.

The individual client signals continue from intermediate node N3 to intermediate node N4 utilizing the same combined format, finally demapped at intermediate node N4 into their respective client signals for final deployment to receiver terminal nodes RTN1 and RTN2. It should be apparent that with multiple client signals at differing data rates on a network infrastructure supporting much higher inter-nodal bandwidth, significant increases in overall efficiency of the network can be achieved.

Figure 3:
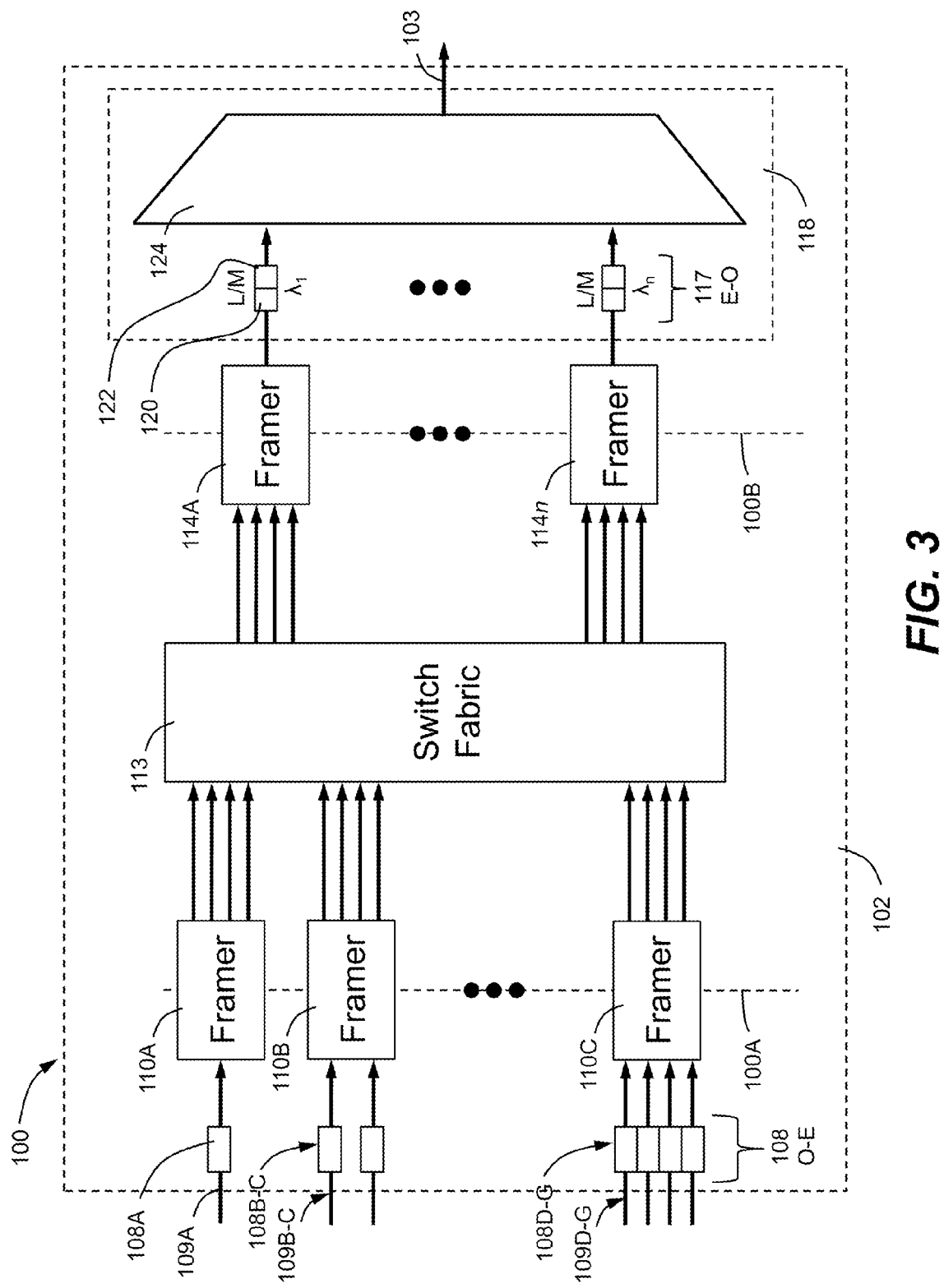
FIG. 3 is a schematic diagram of a transmitter terminal node relative to the transmission of optical signals from the client side to the line side of such a node, in accordance with various aspects of the present invention.

Now turning to FIG. 3, a transmitter terminal node 100 utilized in accordance with the present to receive one or more client signals and format such signals for line side transmission is illustrated, that is transmission over an optical span between two or more nodes of the optical network. While terminal node 100 is discussed in reference to deployment of a client signal on a digital optical network, terminal node 100 may also include receiver functionality, as is discussed for example in greater detail with regard to FIG. 4. The terminal node 100 is depicted comprising one or more input modules 102 which accepts one or more client inputs 109 and provides a multiplexed output 103, such as a WDM optical output signal, for transport on an optical link or span of a digital optical network (not shown). If desired, the multiplexed output 103 may be one of a number n of such outputs corresponding to a number n of input modules which may then be, for example, coupled to a band multiplexer for multiplexing the multiple WDM signals into a single banded optical signal for deployment on the optical link or span (not shown).

For purposes of clarity, only one client signal path propagating through the terminal node 100 will be discussed, however this discussion, except where indicated, will apply to each client signal path of each input module 102(n). For illustration purposes only, an exemplary client signal having a rate of 7.5 Gbps is considered. The input module 102 receives the 7.5 Gbps client signal at an input 109A having a line capacity of 10 Gbps and, if received as an optical signal, converts the optical signal into the electrical domain with use of an O-E converter 117. It should be noted at this point that client signals 109 can also be received as electrical signals in which case there is no need for O-E conversion. Once in the electrical domain, the electrical signal is provided to a framer 110A which then subdivides the signal into a number of intra-nodal frames of a common size and data rate, as discussed above. In this case, given a intra-nodal frame format providing for 2.5 Gbps, the 7.5 Gbps client signal is thus transformed or subdivided into three 2.5 Gbps intra-nodal frames for transmission to a switch fabric 113, via a backplane for example, where such functionality of the input module is found on one or more circuit cards. While four data paths are shown coupling the framer 110A with switch fabric 113, it should be understood that all or any number of each of the four data paths may contain client data depending upon the original data rate of the client signal, such as client signal 109A for example. More specifically since the input 109A can accept a data rate up to 10 Gbps, if for example, the client signal was received by terminal node 100 at a rate of 10 Gbps, then framer 110A would create, or otherwise define, four distinct intra-nodal frames for deployment to switch fabric 113, each of the four intra-nodal frames carrying 2.5 Gbps data streams, together corresponding to the 10 Gbps client signal received. Alternatively, if the client signal 109A is only consuming 2.5 Gbps of bandwidth, the framer 110A would then provide one data stream in the intra-nodal frame format to switch 113, the remaining three data streams not created, or alternatively created with dummy payloads for the purposes of maintaining general connectivity, at the transport frame level, throughout the node infrastructure. As stated above, if the client signal received is at a data rate below the minimum data rate of the transport system, or otherwise the data rate is not a multiple of the minimum data rate, the minimum data rate being 2.5 Gbps in this example, dummy data can be added to the client frame to bring the data rate up to the next highest rate equally divisible by the minimum data rate.

In similar fashion, based upon capacity requirements, the switch fabric 113 would direct the three intra-nodal frames representing the 7.5 Gbps client signal created by framer 110A to a second framer 114A for multiplexing the three intra-nodal frames, along with an additional intra-nodal frame, into a line side frame having a data rate capacity equal to the transport system wavelength capacity, 10 Gbps in this example. It should be apparent that if the per wavelength capacity of the transport system was equal to 2.5 Gbps no such second frame, e.g. the line side frame, need be created.

Now considering an exemplary client signal having a data rate of 2.5 Gbps received at an input 109D and provided to framer 110C, along with inputs 109E-G. In a manner as discussed above, framer 110C will provide four intra-nodal frames, each at a individual rate of 2.5 Gbps, to switch fabric 113. Assuming momentarily that no client data exists on inputs 109E-G, framer 110C provides one 2.5 Gbps intra-nodal frame to switch fabric 113, the single intra-nodal frame representative of the client signal received at input 109D. Since the 7.5 Gbps client signal in the above example only utilizes three-quarters of the wavelength capacity of 10 Gbps, the 2.5 Gbps intra-nodal frame corresponding to the 2.5 Gbps client signal received at input 109D can be switched via switch fabric 113 and provided to framer 114A, along with the remaining three intra-nodal frames representing the client signal received on input 109A. Therefore, 2.5 Gbps of bandwidth which would have been lost is recaptured through utilizing the 2.5 Gbps for transport of the client signal received at input 109C. In this way, individual intra-nodal frames, each representing all or a portion of a client signal, can be combined as necessary for the most efficient transport configuration possible. In any case, the framer 114A combines the four data streams which it receives into a line side frame for transport onto an optical link or span.

For the convenience of the reader, as the various client signals move from the input 109 to the output 103 of input module 102, dotted lines 100A and 100B mark the boundaries for depicting where the client signals are embedded in one or more intra-nodal frames by framers 110 and then into line side frames by framers 114, respectively. As should be readily understood, additional outputs from additional framers 110 may be provided to switch fabric 123 in similar fashion. As discussed above, the intra-nodal frames are then switched, or otherwise directed, by the switch fabric 113 to one of a number of line side framers 114, where the intra-nodal frames are digitally wrapped or mapped into line side transport frames. That is, each line side framer 114 accepts four individual 2.5 Gbps intra-nodal frames and interleaves the data into a signal 10 Gbps electrical data stream, as is discussed in greater detail below.

While not specifically shown, other devices or elements can be provided in the signal path to provide additional functionality, such as FEC encoding for example. In any case, the output of framer 114A is then provided to E-O converter 117 for conversion from the electrical domain to the optical domain prior to being multiplexed by multiplexer 124 into the WDM optical output signal 103. As shown, E-O converter 117 includes modulated laser sources comprising an optical source 120 and modulator 122. While such OE conversion can be accomplished via discrete semiconductor or electro-optic devices, as known and used conventionally in the optical network industry today, a monolithic circuit chip 118 having multiple signal channels is shown as employed for this E-O conversion. Exemplary chip 118 is disclosed in U.S. Pat. No. 7,283,694, entitled "TRANSMITTER PHOTONIC INTEGRATED CIRCUITS (TXPIC) AND OPTICAL TRANSPORT NETWORKS EMPLOYING TXPICS," issued Oct. 16, 2007, the contents of which is incorporated herein in its entirety by reference. As disclosed in U.S. Pat. No. 7,283,694, chip 118 comprises N integrated signal channels where each signal channel includes a laser source 120 (L) and a corresponding modulator 122 (M), the outputs of which are coupled to an integrated optical combiner 124, such as an arrayed waveguide grating (AWG), where the optically modulated signals, $\lambda_1$ to $\lambda_n$, are combined or multiplexed as discussed immediately above. It should be reiterated that additional client signal inputs 109 may be added to network node 100 for ultimate connection to the switch fabric 113 to meet new and ever increasing traffic demands of customers.

Figure 4:
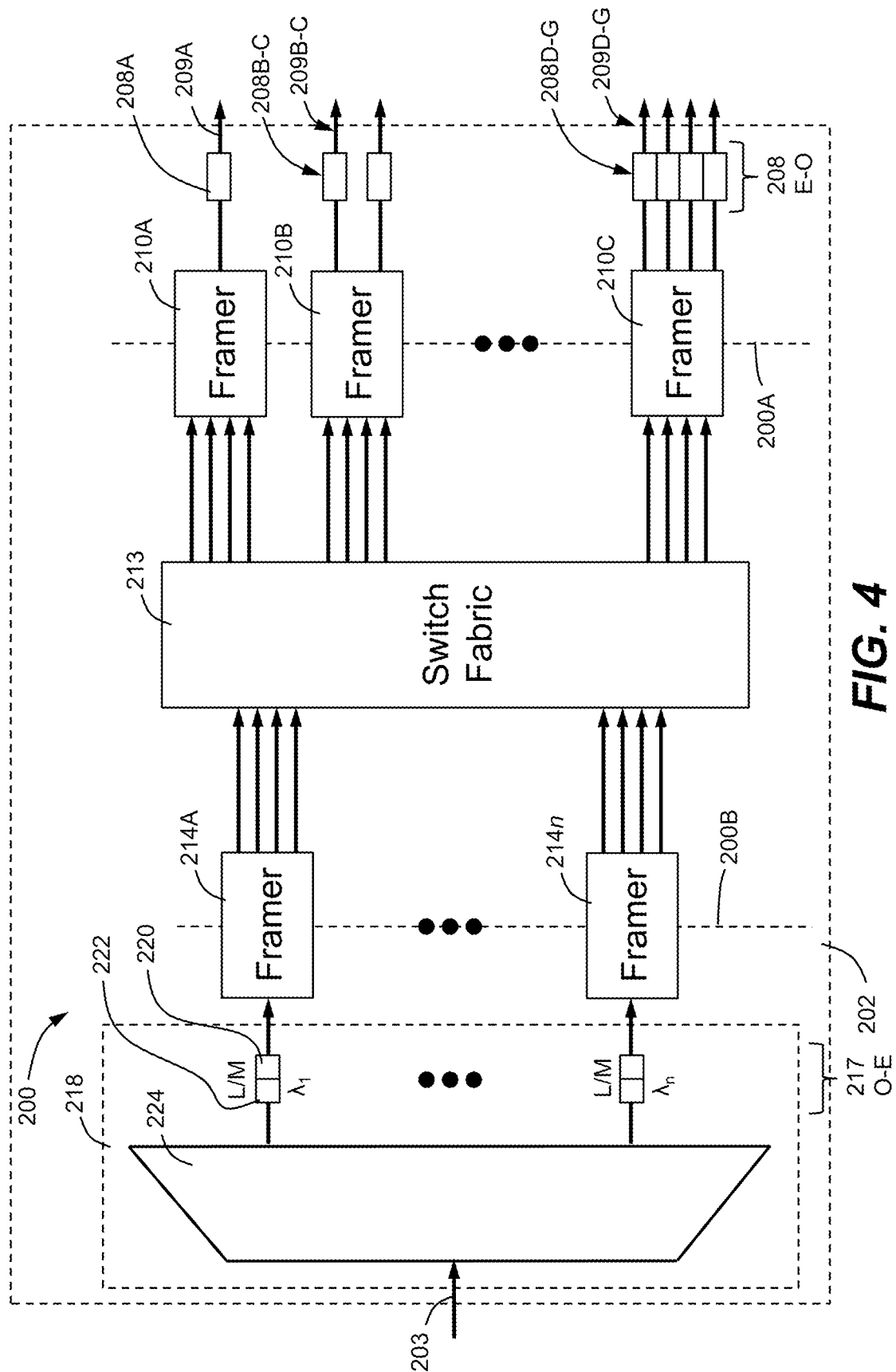
FIG. 4 is a schematic diagram of a receiver terminal node relative to the reception of optical signals from the line side to the client side of such a node, in accordance with various aspects of the present invention.

Reference is now made to FIG. 4, where a receiver terminal node 200 relative to the reception of optical signals from the line side to the client side of such a node will be discussed in greater detail, according to various aspects of this invention. In terminal node 200, as shown, only the receive side is illustrated for purposes of clarity, as the transmit side has been previously discussed relative to FIG. 3. In FIG. 4, a WDM signal is received on an optical link and disbanded, if applicable, by a band module (not shown) and the disbanded WDM signal groups of multiplexed optical signals are received by respective output modules 202 via corresponding optical lines 203, respectively. As discussed above, multiple WDM signals may be banded together to form a banded WDM signal which is transmitted on the network infrastructure. In this case, a demultiplexer would then be provided to receive the banded WDM signal and demultiplex the banded WDM signal into multiple WDM signals, one of which would be provided to output module 202. Thus, terminal node 200 may include multiple output modules 202, one for each respective WDM signal received as part of a banded WDM signal.

The received signal 203 is first decombined by a decombiner 224 and O-E converted by O-E converter 217 in an integrated circuit 218. The decombiner 224 used for decombining or demultiplexing the signal 203 into a plurality of optical signals, e.g. $\lambda_1$ to $\lambda_n$, and then electrically convert each signal in the corresponding O-E converter 217 via an array of on-chip photodetectors 222. Details of exemplary integrated circuit chip 218 are disclosed in U.S. Pat. No. 7,116,851, entitled "OPTICAL SIGNAL RECEIVER, AN ASSOCIATED PHOTONIC INTEGRATED CIRCUIT (RXPIC), AND METHOD IMPROVING PERFORMANCE," issued Oct. 3, 2006, incorporated herein in its entirety by reference. The integrated chip 217 may include chip-integrated electrical signal processing, such as, circuitry for conversion of the detected current signals into voltage signals and/or signal amplification. If required, although not shown, the electrically converted signals are then, for example, FEC decoded or conditioned, prior to being demapped from the line side frame format into the intra-nodal frame format by framers 214. More specifically, an optical signal containing client data in a line side frame format is provided to framer 214A which then converts the line side frame into four intra-nodal frames. At this point, as discussed above, the electrically represented signals are n×N Gbit signals (e.g., 2.5 Gbit signals) or quadrisected N/n Gbit signals (10 Gbit signals), as the case may be, and passed to a switch fabric 213, and finally to an appropriate framer 210A and 210C. For example, of the four intra-nodal frames provided by framer 114A, consistent with our ongoing example above, three of the intra-nodal frames would be provided to framer 210A which then reconstructs the client signal for delivery to the client at an output 209A. The remaining one of four intra-nodal frames provided, or otherwise switched by switch fabric 123, by framer 114A would then be provided to framer 210C and ultimately provided or delivered to the client as a 2.5 Gbps data stream client signal at output 209D, for example.

More specifically, at framers 210, the signals are demapped from the intra-nodal frame format and reassembled into original client signals where they may be then converted into the optical domain via corresponding E-O converters 208 for seamless reception by client equipment. Similar to the discussion with respect to the transmitter terminal node 100, it can be seen that the intra-nodal frames are processed between the dotted lines 200A and 200B, i.e., between the midpoint of framers 210 and 214. It is in this phase that all signals are at the lowest frame rate, which, for example, may be 2.5 Gbps. Note that, in the case here, the quadrisected high bit rate (10 Gbit) signals are reassembled from four partitioned signal sections into a complete signal at the corresponding framer 210A while the separated lower rate (2.5 Gbit) signals are independently presented to E-O converters 208 for conversion into the optical domain.

Now referring to FIG. 5, a brief discussion regarding the general handling of a client signal through an intermediate node 300 will be discussed in greater detail. Data flow through the intermediate node 300 will be discussed in one direction, however it should be apparent that such an intermediate node can support multidirectional data traffic. As shown, a WDM or banded WDM signal 303A, as the case may be, is received by intermediate node 300 from span or link 305. If the received signal 303A is a banded WDM signal then a deinterleaver (not shown) would be utilized to separate the banded WDM signal into one or more WDM signals. The following discussion is directed to the receipt of a single WDM signal for purposes of clarity.

An interface module 332 receives the WDM signal 303A and demultiplexes the WDM signal into a plurality of individual optical signals which are each, in turn, converted into the electrical domain by an Demux/O-E converter 318A, similar to that found in chip 218 discussed above relative to receiver terminal node 200 for example. Once in the electrical domain, each signal, which is in the line side frame format, is then passed to a framer 314A, similar to framer 214 of terminal node 200 for example, which then demaps the signals from the line side frame format into one or more corresponding signals in the intra-nodal frame format. Module 332 then provides the multiple signals in intra-nodal frame format to an interface module 342 via a switch fabric 313A, similar to switch fabric 213 of terminal node 200 for example.

Interface module 332, as well as interface module 342, may provide signal conditioning, such as 3R conditioning as discussed above, if necessary or desired. Once received, interface module 342 directs the plurality of intra-nodal frames to a switch fabric 313B which switches the various signals to provide for an efficient transport system in accordance with the present invention, the switch fabric 313B being similar to switch fabric 113 of transmitter terminal node 100 for example. The signals are then provided to framers 314B which each accept multiple intra-nodal frames and create a corresponding line side frame for conversion into the optical domain and multiplexed with additional optical signals to create a WDM optical signal for deployment on an optical span or link 306 as output signal 303B, in similar fashion as framers 114 and Mux/E-O converter 118 of the transmitter terminal node 100.

Figure 5:
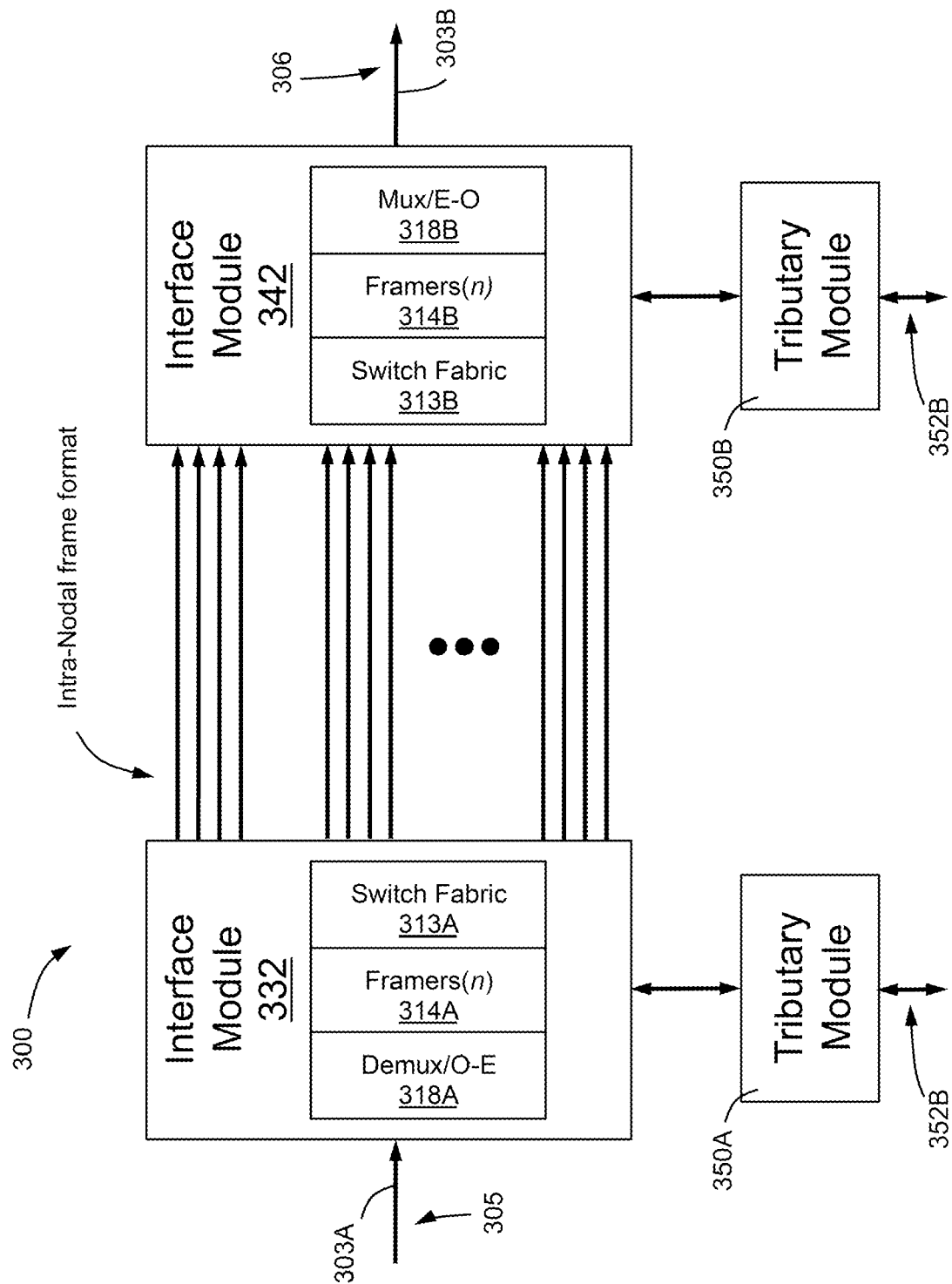
FIG. 5 is a block diagram of an intermediate node, in accordance with various aspects of the present invention.

As shown in FIG. 5, intermediate node 300 can include add/drop functionality. As such, one or more client tributary module 350 can be employed to receive client signals 309 via links 352 and produce corresponding intra-nodal frames, as discussed with respect to terminal node 100 for example. Likewise, client tributary modules 350 can also be employed to receive intra-nodal frames from interface module 332, or from interface module 342, and process the intra-nodal frames into client signals for deployment to the client on lines 352.

As should be readily understood, once in the intra-nodal frame format the client data can be switched via the switch fabric elements of nodes 100, 200 and 300 to be recombined with client data of the same or differing origin to for line side frame data to be transmitted per wavelength, the client side data of the original client signal recombined at least at the receiver terminal node. In this way, data streams of various rates can be more effectively combined to form a more efficient transport system. As discussed above, however, allowing for diverse routing of such intra-nodal frames can result in skew with respect to the different data streams representative of the client data. For example, skew can be based on the medium through which the optical signal is passing. More specifically, different portions of a client signal can travel on differing optical paths which can lead to skew since differing wavelengths travel through an optical fiber medium at different rates. Also, different portions of a client signal can travel on differing paths in the electrical domain, for example when processed in a regeneration intermediate node. Differing electronic paths can result in different processing times which can introduce skew when all the portions of a client signal are finally recombined, at a receiver terminal node for example.

Now turning to FIGS. 6-12, a marking system in accordance with the present invention will be discussed in greater detail. For this specific discussion a data stream or bytestream of a plurality of serialized bytes $A_1$ through $A_n$ will be used to represent a client signal having a data rate of 10 Gbps, as depicted in FIG. 6 as Data Stream A. As discussed above in regard to transmitter terminal node 100, the 10 Gbps data stream is subdivided into four separate 2.5 Gbps streams, $A_{S1}$-$A_{S4}$, used to form four corresponding intra-nodal frames. Also as discussed above, intra-nodal frames can be in a standard frame format in accordance with one or more standards governed by industry organizations, or a proprietary frame format.

Figure 11:
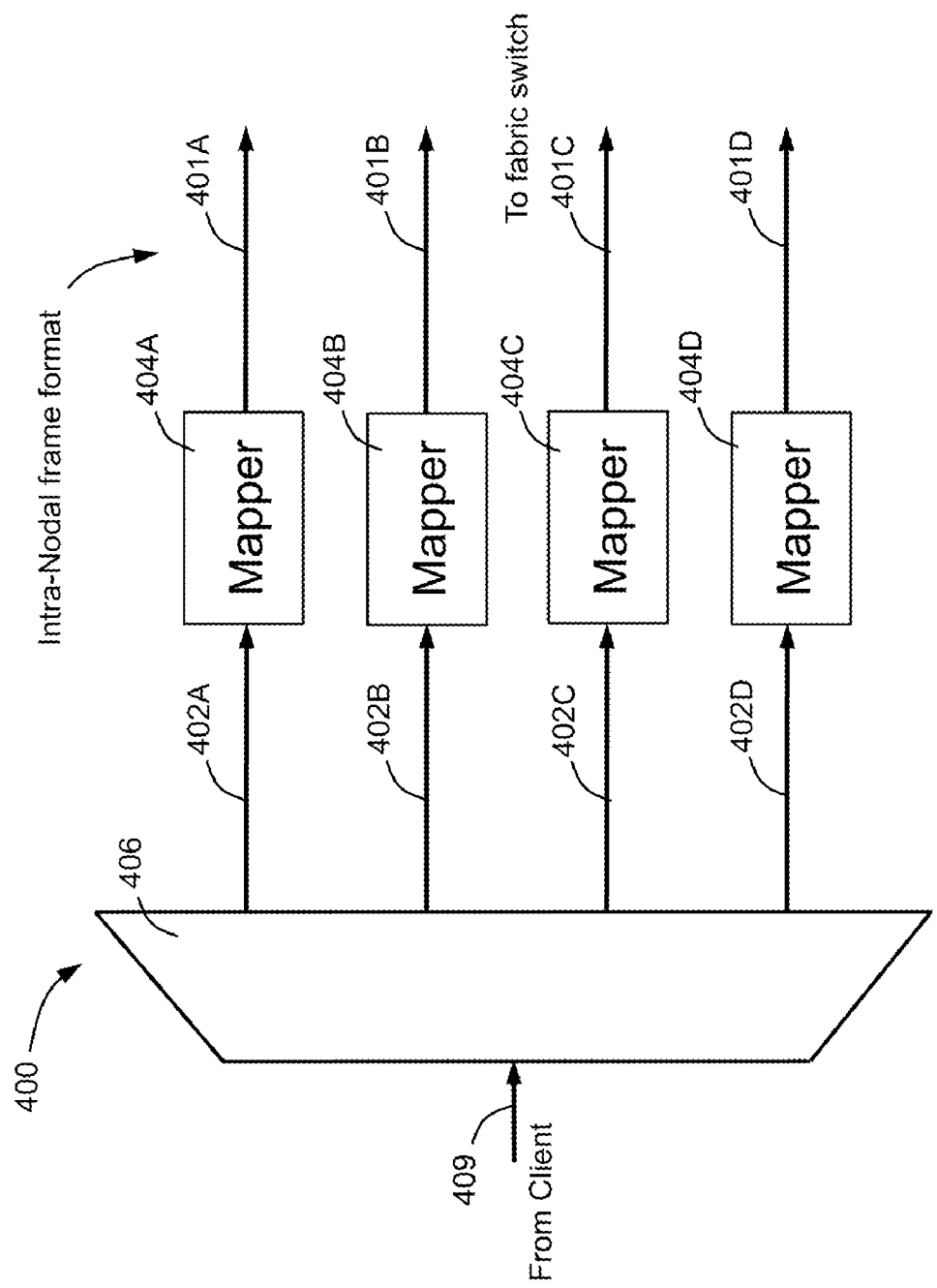
FIG. 11 is a schematic diagram of a portion of the transmitter terminal node of FIG. 3.

Turning also to FIG. 11, a framer 400, similar to framer 110 of terminal node 100, will be discussed in greater detail. As depicted if FIG. 11, a client signal 409, for example a 10 Gbps data stream, is received and provided to a deinterleaver 406 of framer 400 which then subdivides the 10 Gbps stream into multiple data streams 402 each having a data rate of 2.5 Gbps, for example the four streams $A_{S1}$-$A_{S4}$ in the case of a 10 Gbps client signal, as depicted in FIG. 7. Therefore, as should be apparent, if the client signal provided was a signal provided at a rate of 5.0 Gbps, two data streams of 2.5 Gbps would be created, streams 402A-B for example, and, as stated above, the remaining two streams of 2.5 Gbps 402C-D may also be provided to ensure proper interface timing is maintain between the various nodes of the network infrastructure, the two remaining streams containing dummy payload values. The 10 Gbps client stream can be deinterleaved with any suitable algorithm. For example, various groups of bits or bytes may be selected according to certain algorithms to create the multiple 2.5 Gbps data streams 402. One such algorithm is illustrated in FIG. 7 where every two bytes of the 10 Gbps data stream of FIG. 6 is taken and directed to sequential data streams $A_{S1}$-$A_{S4}$. Thus, bytes $A_1$ and $A_2$ of the data stream of FIG. 6 are directed for creation of data stream $A_{S1}$. In similar fashion, bytes $A_3$ and $A_4$ are directed to form data stream $A_{S2}$, bytes $A_5$ and $A_6$ are directed to form data stream $A_{S3}$ and bytes $A_7$ and $A_8$ are directed to form data stream $A_{S4}$.

As depicted in FIG. 11, each 2.5 Gbps stream 402A-D is then provided to a corresponding mapper 404, for example mapper 404A through 404D. Each mapper 404 accepts the corresponding data stream 402 and maps the incoming 2.5 Gbps data into a intra-nodal frame format. Each mapper 402 may include a buffer, such as a first-in first-out or FIFO buffer, to temporary store data as the data is being processed into the intra-nodal frame format. Once the client payload is distributed between the corresponding four intra-nodal frames 401A-D, each frame is provided to a fabric switch element, such as fabric switch 113 discussed above with respect to terminal node 100. As the client payload is being mapped into the corresponding intra-nodal frames 401, a frame marker M is introduced or embedded into the client payload, for example markers $M_{S1}$-$M_{S4}$ introduced into data streams $A_{S1}$-$A_{S4}$, respectively. Each marker $M_{S1}$-$M_{S4}$ may be unique with respect to a given client signal such that, for example, two or more client signals can be encoded into corresponding intra-nodal frames and then combined into a single line side frame for deployment across the network infrastructure, as discussed herein. The unique markers associated with corresponding intra-nodal frames encompassing the client signals can then be utilized to recombine the two or more client signals, as discussed in greater detail below. At should be readily understood, for systems having lower capacity per wavelength, each intra-nodal frame may be encoded onto a single wavelength, e.g. one intra-nodal frame per wavelength, as part of a WDM signal for example. In such a case, the intra-nodal frame also functions as the line side frame.

As is better understood in the discussion below relative to FIG. 12, this frame marker M will then be used to realign the client data or payload portion of each 2.5 Gbps intra-nodal frame 401 so that the originally transmitted client signal can be obtained or extracted despite the fact that the associated individual intra-nodal frames 401 may have arrived from varying paths along the network infrastructure, as discussed herein. Furthermore, to ensure constant feedback relative to the data integrity with respect to the embedded markers M, the mappers 404 may embed the markers at known periodic intervals throughout the client payload, as indicated in FIG. 7.

Figure 9:
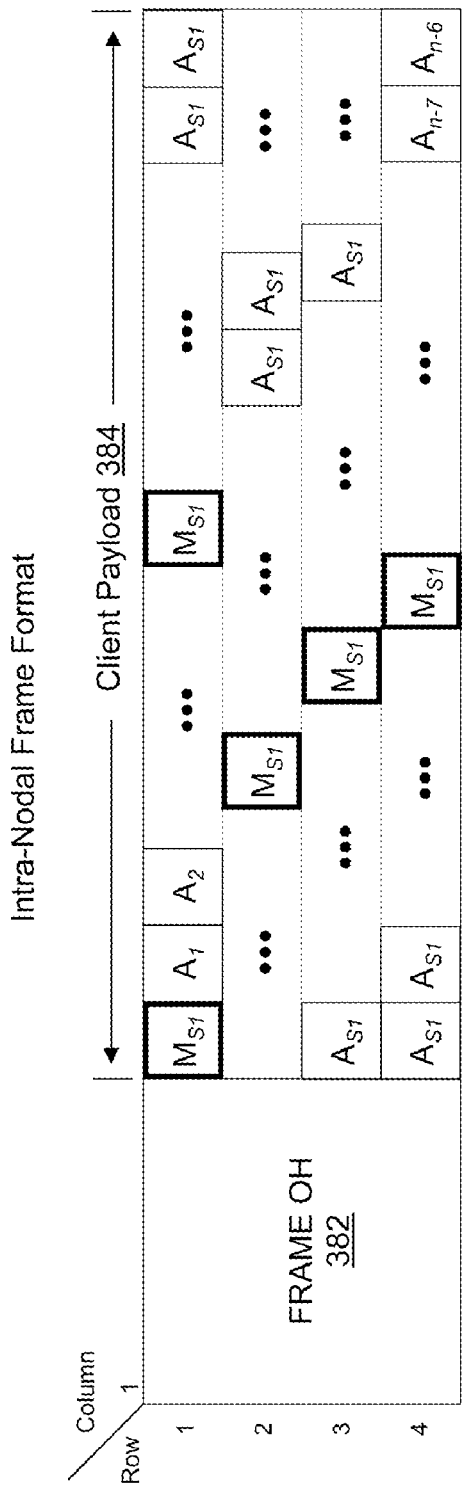
FIG. 9 depicts an exemplary frame format depicting a client payload section embedded with a data marker used in accordance with various aspects of the present invention.

Now turning to FIG. 9, an exemplary intra-nodal frame format 380 will be discussed in greater detail. As with various known frame formats, the intra-nodal frame format 380 consists of a matrix of 4 rows by a plurality of columns. The intra-nodal frame format 380 is further divided into a frame overhead portion 382 and a client payload portion 384. As depicted in FIG. 9, the payload portion 384 of the frame includes the client data corresponding to bytestream $A_{S1}$, and the associated marker $M_{S1}$ which is embedded in the client data. As should be apparent, for clarity not all the data of bytestream $A_{S1}$, nor every marker $M_{S1}$, is depicted in the intra-nodal frame format 384 of FIG. 9. Furthermore, the frame format 380 may include additional space (not shown) allocated for specific functionality, such as forward error correction. The line side frame format is generally similar to the intra-nodal frame format 380, however is sized to include a plurality of intra-nodal frames within the client payload section of the line side frame. As with the intra-nodal frame format 380, the line side frame format may include additional space allocated for additional functionality, such as forward error correction.

Now turning back to FIG. 11, mappers 404A-D are clocked together to ensure that at a start time to all of the data stream markers $M_{S1}$-$M_{S4}$ are aligned or synchronized, as depicted in FIG. 7. Moreover, since each mapper 404 accepts the same time base, all periodic markers $M_{S1}$-$M_{S4}$, if present, are aligned at subsequent time periods equal to the marker periodic interval, depicted as $t_{MPeriod}$ in FIG. 7. As should be apparent, with a known time period between subsequent markers M within a given data stream, a corresponding known number of payload bytes appear in the data stream between each subsequent marker M.

Figure 12:
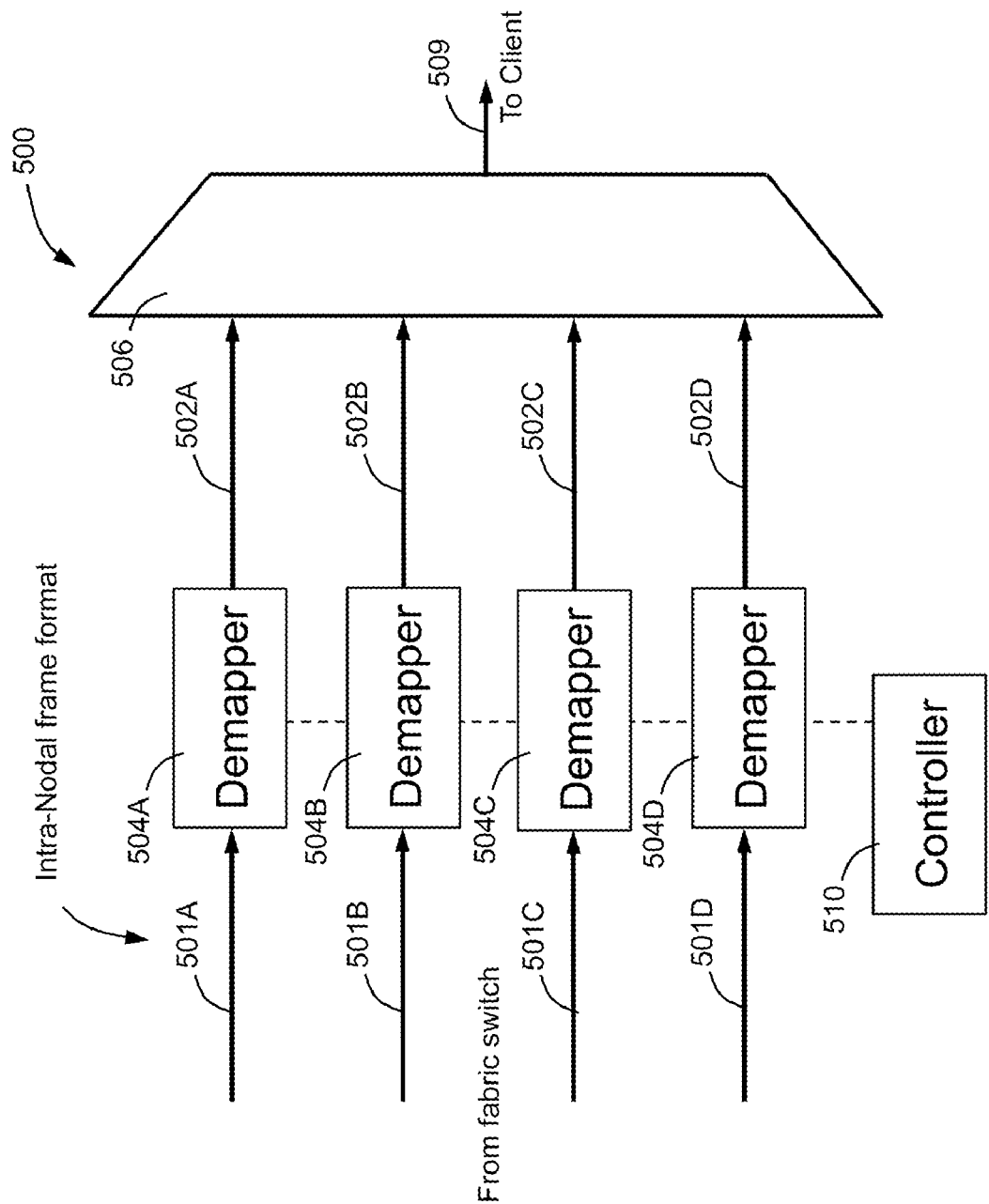
FIG. 12 is a schematic diagram of a portion of the receiver terminal node of FIG. 4.

Turning to FIG. 12, realignment of the client payload and formation of the client signal will be discussed in greater detail. As discussed above with respect to terminal node 200, when a number of intra-nodal frames 501 corresponding to a given client signal, such as a 10 Gbps signal in the present example, are presented to a receiver terminal node 500, each of the corresponding intra-nodal frames 501A-D are demapped by corresponding demappers 504A-D prior to being provided to an interleaver 506 which interleaves each subdivided data stream into a single data stream representative of the original client signal, and provided to the client. More specifically, each data stream 501 is provided to a corresponding demapper 504 and the demapper 504 searches the data stream for the existence of a corresponding marker, $M_{S1}$-$M_{S4}$ for example. Once the marker is discovered, the data in the data stream immediately subsequent to the marker is directed to a buffer, such as a FIFO, in each corresponding demapper 504. Subsequently, the data is read from each FIFO of each demapper 504 and interleaved together by interleaver 506 to reconstruct the original client signal, in this case the original client 10 Gbps signal, the mappers 504 cooperating to align the payload data and provide the individual data streams 502A-D to the interleaver 506 such that the client signal may be extracted.

Figure 8:
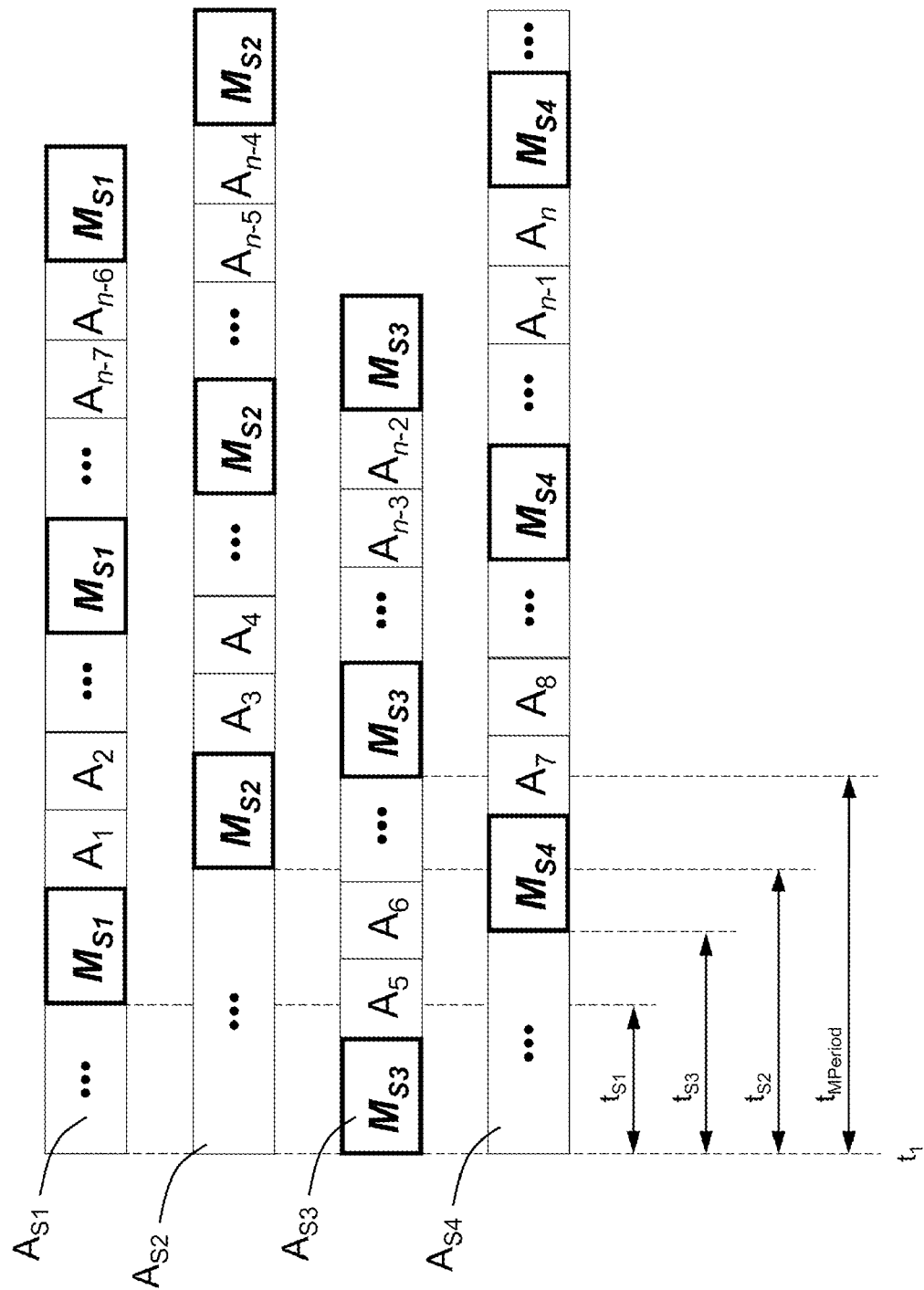
FIG. 8 is another exemplary depiction of four data streams relative to the time domain, corresponding to the data stream of FIG. 6 at a receiver terminal node, in accordance with various aspects of the present invention.

Now turning also to FIG. 8, the alignment process will be discussed in greater detail. At a time $t_1$ the marker $M_{S3}$ of bytestream $A_{S3}$ is discovered in the corresponding intra-nodal frame at the corresponding demapper 504C and the data of bytestream $A_{S3}$ immediately subsequent to the marker $M_{S3}$ is directed to the FIFO of demapper 504C. At a subsequent time, $t_{S1}$, relative to time $t_1$ a second marker $M_{S1}$ is discovered in the corresponding intra-nodal frame at demapper 504A, and at a subsequent time $t_{S2}$ relative to time $t_1$ a third marker $M_{S4}$ is discovered in the corresponding intra-nodal frame at demapper 504D. Finally, a fourth marker $M_{S2}$ is discovered in the corresponding intra-nodal frame at demapper 504B at a time $t_{S3}$ relative to time $t_1$, as depicted. In similar fashion to mapper 504C, once the four markers $M_{S1}$-$M_{S4}$ are discovered, data in the bytestream immediately subsequent to the corresponding marker is directed to the corresponding FIFO of mapper 504. The data representative of the client payload data can then be extracted and interleaved back into the original form of the client signal according to the algorithm used to establish the corresponding payload data which made up the corresponding client data frames, as discussed above. More specifically, once the position of each marker $M_{S1}$-$M_{S4}$ is known then client data relative to the marker is known, as well. That is, the specific relative locations of the bytes forming bytestreams $A_{S1}$-$A_{S4}$ are known and the bytes $A_1$ through $A_n$ can be extracted from the FIFO units of the demappers 504 and combined by the interleaver 506 to form the client signal for delivery to the client.

As should be apparent, once the markers M are detected in the client payload data, the data in the FIFO of each demapper 504 need not be shifted, or otherwise positioned at a specific location within the FIFO, for alignment of the various data streams to take place. Rather, a pointer may be established to identify that portion of the FIFO which holds the starting point of the client payload data of the corresponding received bytestream. In this way, the location of the various bytes of the data streams $A_{S1}$-$A_{S4}$ within each of the FIFO units of demappers 504 can be located and provided to the interleaver 506 in accordance with the algorithm used to subdivide the client signal at the transmitter terminal node, as discussed above. Thus, in the present example, Bytes $A_1$ and $A_2$ from $A_{S1}$ can be provided to interleaver 506, and then Bytes $A_3$ and $A_4$ of stream $A_{S2}$ can be provided to interleaver 506, and then Bytes $A_5$ and $A_6$ of stream $A_{S3}$ can be provided to interleaver 506, etc. Furthermore, if periodic markers were utilized as discussed above, since the periodic markers M were established at a know periodic interval $t_{MPeriod}$, once the markers M are originally discovered the subsequent locations of the markers M within the multiple data streams are thus known, and the process of data recovery can continue as discussed above.

In situations where the skew, that is the time differences between references $t_{S1}$, $t_{S4}$, and $t_{S2}$ discussed above, are observed to be greater than one half the marker interval time period of $t_{MPeriod}$, the relative time between the received markers M can no longer be accurately determined. In such cases, the marker can further comprise a counter value which is initialized at an initial minimum value and then increments a each subsequent marker location to a maximum value prior to resetting to the minimum value once again. In this way, when the marker M is discovered, a corresponding marker counter value can be also extracted to provide for better correlation between the payload data of the multiple data streams received. In other words, skew larger than the periodic interval $t_{MPeriod}$ can be accommodated since the data pointers in each FIFO of each demapper 504 can be set to the specific location of the subsequent data corresponding to the periodic marker M having the unique counter value. As should be readily understood, the skew which can be accommodated is limited to the repetition rate of the marker counter. Given a marker counter value having a resolution of 16 bits, then skew equal to the marker period, $T_{MPeriod}$, times 2 to the power of the resolution of the marker counter, or 216 for a 16 bit resolution, can be overcome.

The above processes of marker detection and data extraction are for illustration purposes only and other processes of extracting client data from multiple data streams are contemplated. For example, the markers, if desirable, can be pushed into the FIFO units along with the client payload data, and an optional controller 510 which interfaces to each demapper 504 can then search the FIFO units for the markers M. Once the controller 510 has identified markers $M_{S1}$-$M_{S4}$ in the client payload data of corresponding bytestreams or data streams $A_{S1}$-$A_{S4}$, the controller 510 can then extract the data and provide the data to the interleaver 506 according to the algorithm utilized to initially subdivide the client signal at the transmitter terminal node 100, as discussed above.

Figure 10:
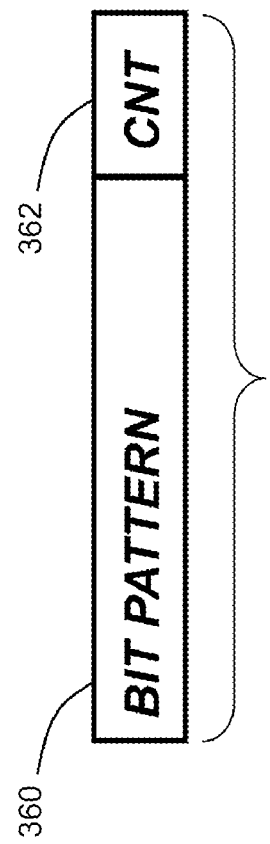
FIG. 10 depicts an exemplary data marker used in accordance with various aspects of the present invention.

An exemplary format of the marker M is depicted in FIG. 10. As shown, the marker M is comprised of two portions, a marker portion 360 having a known bit pattern, and an optional counter portion 362. The marker bit pattern can be any suitable length such as to allow for distinguishing the marker bit pattern from payload data. For example, the shorter the length of the marker M bit pattern, the longer it may take to determine the location of the marker M within the client payload data, with longer marker M bit pattern lengths leading to more robust framing and quicker syncing. Moreover, the longer the marker M bit pattern length, the less space in the client payload of the corresponding intra-nodal frame, and ultimately the line side frame, for client payload data. In any case, the marker bit pattern can be any suitable length, such as for example 16, 32, 48 bits or longer in length. Additionally, depending on the payload data type, a unique marker M bit pattern could be specifically selected to reduce the probability of false syncs with the marker. As discussed above, once the original position of the marker is determined the system is free running in the sense that the next marker will be present at a position within the corresponding bytestream at a known location equivalent to one marker interval time period $t_{MPeriod}$, which is programmable as well. As should be readily understood, the higher the periodic marker interval rate, the more client payload envelope, as part of the intra-nodal frame format for example, is utilized for support of the marker M and not made available for transport of client data. The counter portion of the marker M definition may be any suitable length to ensure that an observed skew is overcome. With sufficient skew compensation made available from the use of marker M, multiple intra-nodal frames corresponding to a specific client signal may take separate optical spans or links.

Figure 13:
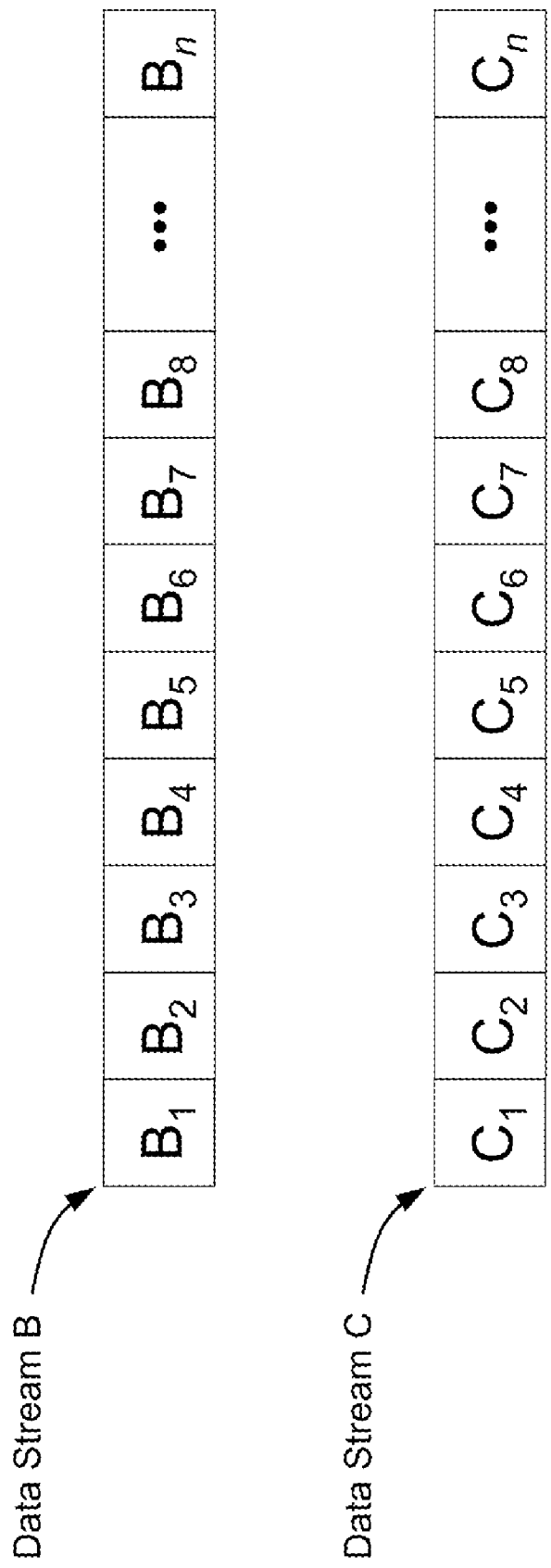
FIG. 13 is a depiction of a first exemplary data stream representing a first client signal and a second exemplary data stream representing a second client signal.
Figure 14:
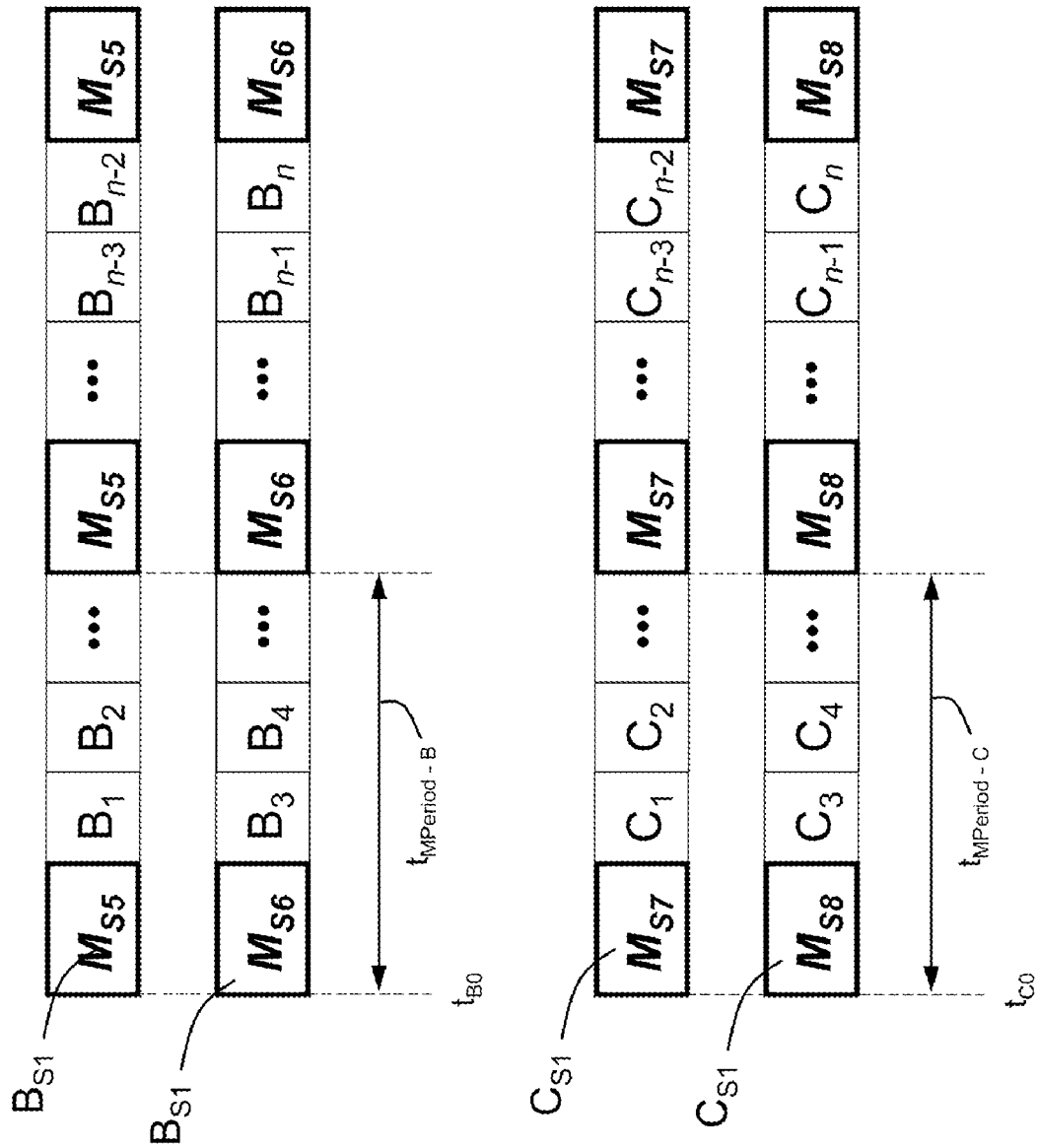
FIG. 14 is an exemplary depiction of four data streams relative to the time domain, a first two of the four data streams corresponding to the first exemplary data stream of FIG. 13 at a transmitter terminal node and a second two of the four data streams corresponding to the second exemplary data stream of FIG. 13 at a transmitter terminal node, in accordance with various aspects of the present invention.

Now turning to FIGS. 13-17, another example employing a marking system in accordance with various aspects of the present invention will be discussed in greater detail. For this specific discussion two data streams are considered, labeled as Data Stream B and Data Steam C, each comprising a plurality of serialized bytes $B_1$ through $B_n$ and $C_1$ through $C_n$, respectively. Data Stream B represents a first signal of a client to be transported across the network infrastructure, the first signal having a data rate of 5 Gbps. While Data Stream C represents a second signal of the same client to be transported across the network infrastructure. As discussed above in regard to transmitter terminal node 100, the each of the individual 5 Gbps Data Streams, A and B, are subdivided into two separate 2.5 Gbps data streams, $B_{S1}$-$B_{S2}$ and $C_{S1}$-$C_{S2}$, respectively, as generally depicted in FIG. 14. Each data stream $B_{S1}$-$B_{S1}$ and $C_{S1}$-$C_{S1}$ is then each used to form two corresponding intra-nodal frames, as discussed above relative to Data Stream A.

Figure 16:
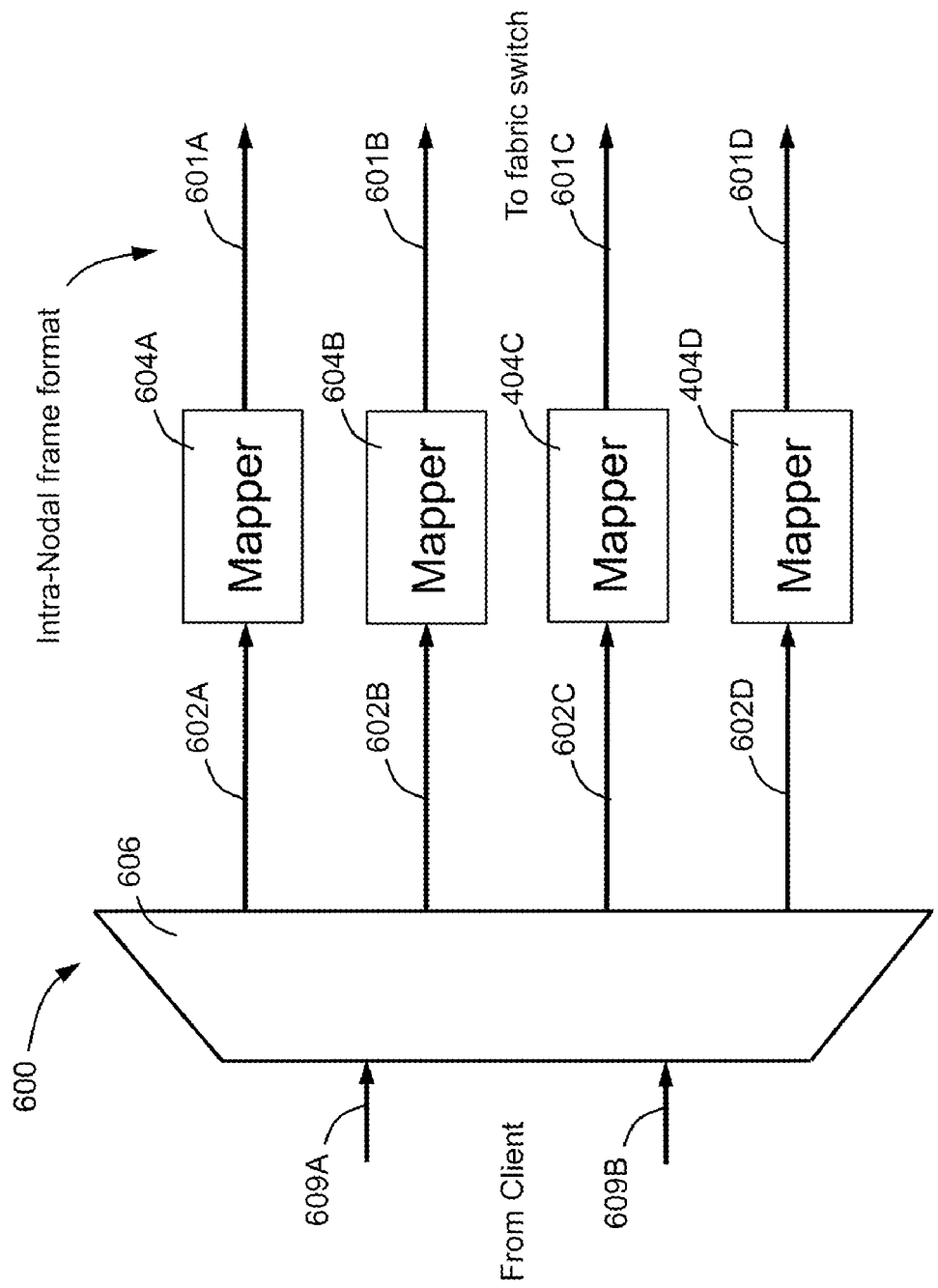
FIG. 16 is a schematic diagram of a portion of the transmitter terminal node of FIG. 3.

Turning also to FIG. 16, a framer 600, similar to framer 110 of terminal node 100, will be discussed in greater detail. As depicted if FIG. 16, a first client signal 609A, for example the 5 Gbps Data Stream B, is received and provided to a deinterleaver 606 of framer 600 which then subdivides the 5 Gbps stream into multiple data streams 602A-B each having a data rate of 2.5 Gbps, for example the two data streams $B_{S1}$-$B_{S2}$, as depicted in FIG. 14. Additionally, a second client signal 609B, for example the 5 Gbps Data Stream C, is received and provided to the deinterleaver 606 which then subdivides the 5 Gbps stream into multiple data streams 602C-D each having a data rate of 2.5 Gbps, for example the two data streams $C_{S1}$-$C_{S2}$, as depicted in FIG. 14. As with the 10 Gbps client stream example discussed above, each of the 5 Gbps streams B and C can be deinterleaved with any suitable algorithm. For example, various groups of bits or bytes may be selected according to certain algorithms to create the multiple 2.5 Gbps data streams 602. One such algorithm is illustrated in FIG. 14 where every two bytes of each of the 5 Gbps data streams B and C of FIG. 13 is taken and directed to sequential data streams $B_{S1}$-$B_{S2}$ and $C_{S1}$-$C_{S2}$, respectively. Thus, bytes $B_1$ and $B_2$ of the Data Stream B of FIG. 13 are directed to form data stream $B_{S5}$. In similar fashion, bytes $B_3$ and $B_4$ are directed to form data stream $B_{S6}$. Similarly, bytes $C_1$ and $C_2$ are directed to form data stream $C_{S7}$ and bytes $C_3$ and $C_4$ are directed to form data stream $C_{S8}$.

As depicted in FIG. 16, each 2.5 Gbps stream 602A-D is then provided to a corresponding mapper 604, for example mapper 604A through 604D. Each mapper 604 accepts the corresponding data stream 602 and maps the incoming 2.5 Gbps data into an intra-nodal frame format. As with mappers 402 discussed above, each mapper 602 may include a buffer, such as a first-in first-out or FIFO buffer, to temporary store data as the data is being processed into the intra-nodal frame format. Once the client payload of the first client signal is distributed between the corresponding two intra-nodal frames 601A-B and the client payload of the second client signal is distributed between the corresponding two intra-nodal frames 601C-D, each frame is provided to a fabric switch element, such as fabric switch 113 discussed above with respect to terminal node 100. As each client payload is being mapped into the corresponding intra-nodal frames 601 by the corresponding mapper 604, a frame marker M is introduced or embedded into the client payload, for example markers $M_{S5}$-$M_{S6}$ introduced into data streams $B_{S1}$-$B_{S2}$ and markers $M_{S7}$-$M_{S8}$ introduced into data streams $C_{S1}$-$C_{S2}$, respectively. Additionally, as depicted, the markers $M_{S5}$-$M_{S8}$ may be periodically positioned within the client payload.

As in the example above, the frame markers $M_{S5}$-$M_{S6}$ will be used to realign the client data or payload portion each 2.5 Gbps intra-nodal frame 601A-B corresponding to Data Stream B, while frame markers $M_{S7}$-$M_{S8}$ will be used to realign the client data portion of each 2.5 Gbps intra-nodal frame 601 corresponding to Data Stream C.

As with mappers 404A-D, mappers 604A-B and mappers 604C-D are clocked together to ensure that at a start time $t_{B0}$ the data stream markers $M_{S5}$-$M_{S6}$ are aligned or synchronized, as depicted in FIG. 14, and at a start time $t_{C0}$ the data stream markers $M_{S7}$-$M_{S8}$ are aligned. Moreover, since each mapper 604 accepts the same time base, periodic markers $M_{S5}$-$M_{S6}$, if present as discussed above, are aligned at subsequent time periods equal to the marker periodic interval, depicted as $t_{MPeriod-B}$ in FIG. 14, while each periodic markers $M_{S7}$-$M_{S8}$ are aligned at subsequent time periods equal to the corresponding marker periodic interval, depicted as $t_{MPeriod-C}$.

Figure 17:
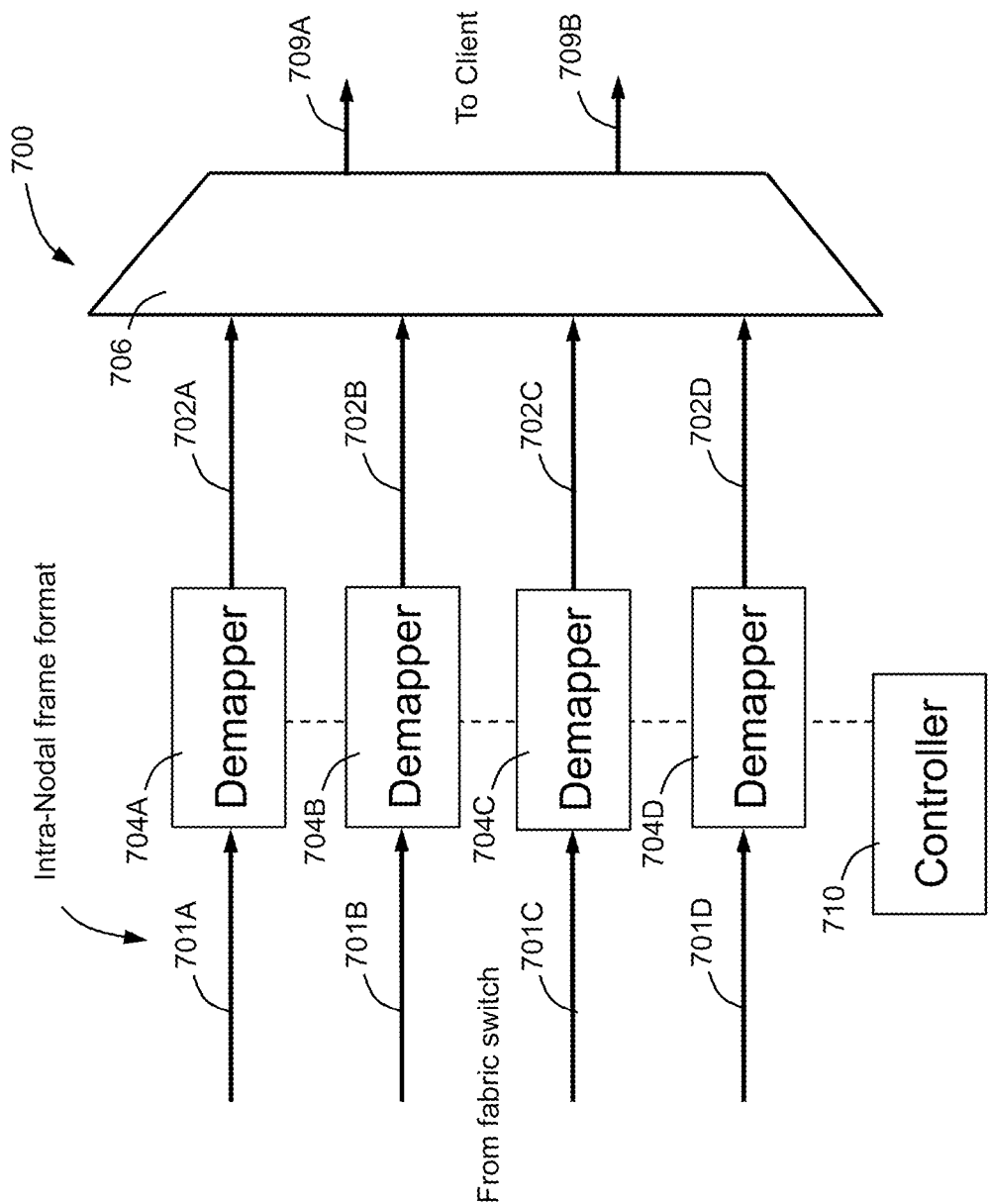
FIG. 17 is a schematic diagram of a portion of the receiver terminal node of FIG. 4.

Turning to FIG. 17, realignment of the client payload and formation of each of the client signals will be discussed in greater detail. As discussed above with respect to terminal node 200, a number of intra-nodal frames 701, corresponding to a first and second 5 Gbps client signal in the present example, are presented to a receiver terminal node 700. The intra-nodal frames 701A-B are demapped by corresponding demappers 704A-B prior to being provided to an interleaver 706, while intra-nodal frames 701C-D are demapped by corresponding demappers 704C-D prior to being provided to the interleaver 706. Interleaver 706 interleaves demapped data streams 702A and 702B into a single data stream representative of the first client signal in the present example, and provided to the client on a first output 709A. Additionally, interleaver 706 interleaves demapped data streams 702C and 702B into a signal data stream representative of the second client signal in the present example, and provided to the client on a second output 709B.

More specifically, considering only the intra-nodal frame data streams 701A-B, each data stream 701A-B is provided to a corresponding demapper 704A-B which searches the data stream for the existence of a corresponding marker, $M_{S5}$-$M_{S6}$ for example. Once the marker is discovered, the data in the data stream immediately subsequent to the marker is directed to a buffer, such as a FIFO, in each corresponding demapper 704. Subsequently, the data is read from each FIFO of each demapper 704 and interleaved together by interleaver 706 to reconstruct the first original client signal, in this case the first original client 5 Gbps signal, the mappers 704A-B cooperating to align the client payload data and provide the individual data streams 702A-B to the interleaver 706 such that the first client signal may be extracted. In similar fashion, the second client signal is demapped and extracted.

Figure 15:
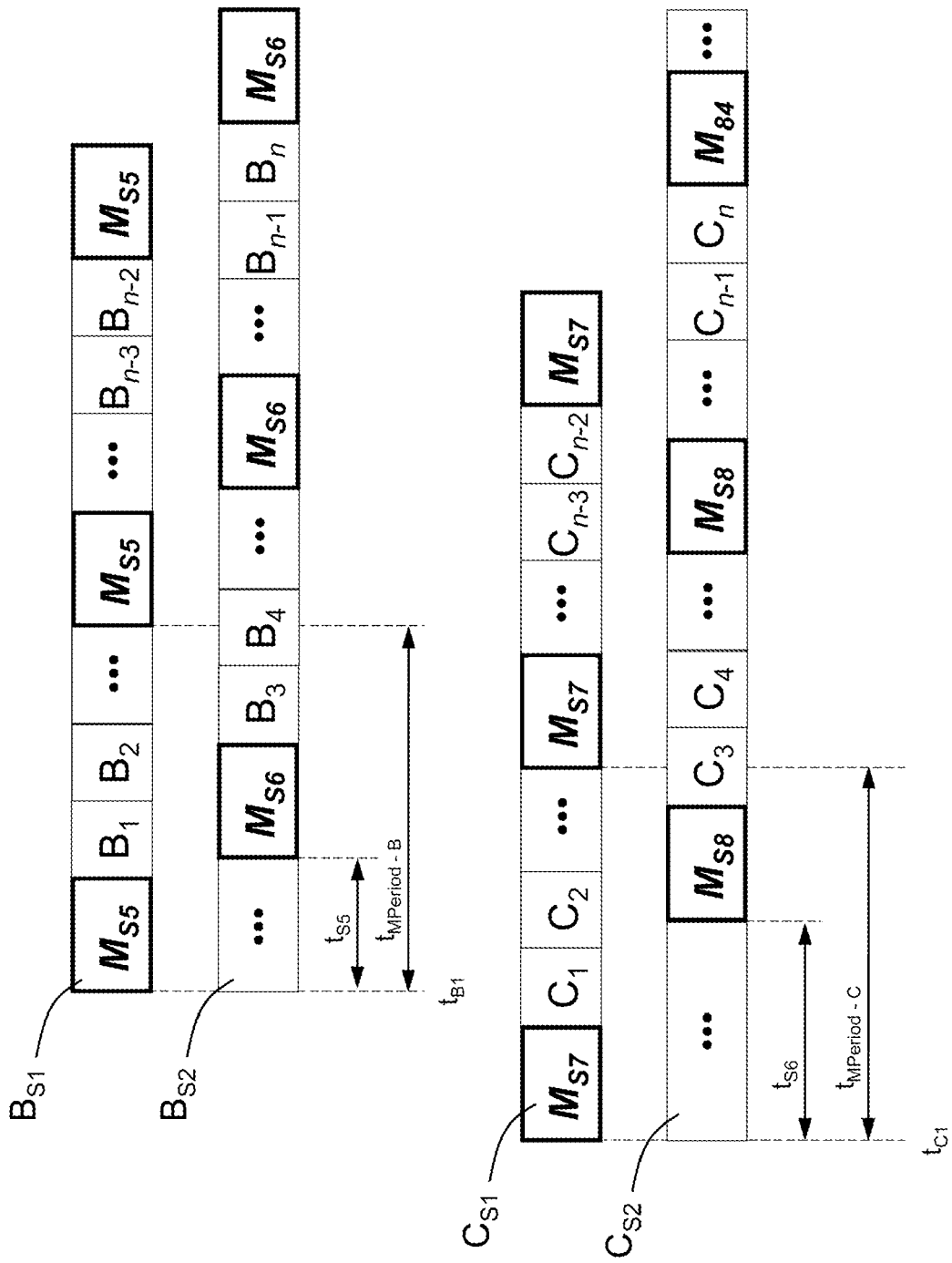
FIG. 15 is another exemplary depiction of four data streams relative to the time domain, a first two of the four data streams corresponding to the first exemplary data stream of FIG. 13 at a receiver terminal node and a second two of the four data streams corresponding to the second exemplary data stream of FIG. 13 at a receiver terminal node, in accordance with various aspects of the present invention.

Now turning also to FIG. 15, the alignment process of the client data payload correspond to each Data Stream B and C will be discussed in greater detail. First considering only Data Stream C, at a time $t_{C1}$ the marker $M_{S7}$ of bytestream $C_{S1}$ is discovered in the corresponding intra-nodal frame at the corresponding demapper 704C and the data of bytestream $C_{S1}$ immediately subsequent to the marker $M_{S7}$ is directed to the FIFO of demapper 704C. At a subsequent time, labeled $t_{S6}$, relative to time $t_{C1}$ a second marker $M_{S8}$ is discovered in the corresponding intra-nodal frame at demapper 704D. Once markers $M_{S7}$ and $M_{S8}$ are discovered and the corresponding FIFO units of demappers 704C-D contain data, the data representative of the first client payload data can then be extracted from the FIFO units of demappers 704C-D and interleaved back into its original form by interleaver 706 according to the algorithm used to establish the corresponding payload data which made up the corresponding client data frames of the first client signal, as discussed above. Now considering Data Stream B, at a time $t_{B1}$ the marker $M_{S5}$ of bytestream $B_{S1}$ is discovered in the corresponding intra-nodal frame at the corresponding demapper 704A and the data of bytestream $B_{S1}$ immediately subsequent to the marker $M_{S5}$ is directed to the FIFO of demapper 704A. At a subsequent time, labeled $t_{S5}$, relative to time $t_{B1}$ a second marker $M_{S6}$ is discovered in the corresponding intra-nodal frame at demapper 704B. Once markers $M_{S5}$ and $M_{S6}$ are discovered and the corresponding FIFO units of demappers 704A-B contain data, the data representative of the second client payload data can then be extracted from the FIFO units of demappers 704A-B and interleaved back into its original form by interleaver 706 according to the algorithm used to establish the corresponding payload data which made up the corresponding client data frames of the second client signal, as discussed above. In this way, two separate client signals can be deployed on a network infrastructure in a more efficient manner, two 5 Gbps signals deployed on a single 10 Gbps link or span for example, rather than on two independent 10 Gbps links or spans resulting in a loss of 10 Gbps of bandwidth. As with the 10 Gbps example of FIGS. 6-12, to compensate for skew larger than one-half the corresponding periodic interval of $t_{MPeriod-B}$ or $t_{MPeriod-C}$, for Data Streams $B_{S1}$-$B_{S2}$ and $C_{S1}$-$C_{S2}$, respectively, the marker M can include a counter value.

While the invention has been described in conjunction with several specific embodiments, it is evident to those skilled in the art that many further alternatives, modifications and variations will be apparent in light of the foregoing description.

Thus, the invention described herein is intended to embrace all such alternatives, modifications, applications and variations as may fall within the spirit and scope of the appended claims.

What is claimed is:

1. A transport system, comprising:
a transmitter terminal node, including:
a deinterleaver circuit configured to receive a client data stream including client data, the deinterleaver supplying the client data to first and second data streams;
a framer circuit configured to generate a first plurality of frames, each of which including a corresponding one of a plurality of first headers and a corresponding one of a plurality of first payloads, each of the plurality of first payloads including a plurality of first marker bits, the framer circuit also being configured to generate a second plurality of frames, each of which including a corresponding one of a plurality of second headers and a corresponding one of a plurality of second payloads, each of the plurality of second payloads including a plurality of second marker bits; and
a receiver terminal node including:
a controller circuit configured to determine a delay between an arrival at the receiver of the plurality of first marker bits provided in one of the plurality of first payloads and an arrival at the receiver of the plurality of second marker bits provided in one of the plurality of second payloads, the controller generating a control signal based on the delay; and a demapper circuit configured to receive the first and second pluralities of frames and reconstruct the first and second data streams; and
an interleaver circuit configured to receive the first and second data streams and reconstruct the client data based on the control signal and the first and second data streams.

2. The transport system of claim 1, wherein the first plurality of frames is transmitted on a first optical signal having a first wavelength and the second plurality of frames is transmitted on a second optical signal having a second wavelength.

3. The transport system of claim 2, wherein the first and second wavelengths are part of a WDM signal.

4. The transport system of claim 1, wherein the framer circuit is a first framer circuit, the transport system further comprising a second framer circuit, the second framer circuit configured to receive the first and second plurality of frames and generate a third plurality of frames, the third plurality of frames transmitted on a third optical signal having a third wavelength.

5. The transport system of claim 1, further comprising an intermediate node, at least one of the first and second plurality of frames being transmitted from the intermediate node on a fourth optical signal having a fourth wavelength.

6. The transport system of claim 1, wherein each of the first and second plurality of frames are of the same size and data rate.

7. The transport system of claim 1, wherein each of the plurality of first and second marker bits form a bit pattern.

8. The transport system of claim 7, wherein the bit pattern is unique for each of the plurality of first and second marker bits.

9. The transport system of claim 1, wherein the plurality of first marker bits form a first bit pattern, the first bit pattern being periodically inserted within each of the plurality of first payloads of the first plurality of frames at a first time interval, and the plurality of second marker bits form a second bit pattern, the second bit pattern being periodically inserted within each of the plurality of second payloads of the second plurality of frames at a second time interval.

10. The transport system of claim 9, wherein the first time interval equals the second time interval.

11. The transport system of claim 9, wherein the first and second bit patterns each comprise a counter value, the counter value of the first bit pattern being incremented at every periodic occurrence of the first bit pattern within each of the plurality of first payloads of the first plurality of frames, and the counter value of the second bit pattern being incremented at every periodic occurrence of the second bit pattern within each of the plurality of second payloads of the second plurality of frames.

12. A communication method, comprising:
receiving a client data stream including client data;
supplying the client data to first and second data streams;
generating a first plurality of frames, each of which including a corresponding one of a plurality of first headers and a corresponding one of a plurality of first payloads, each of the plurality of first payloads including a plurality of first marker bits;
generating a second plurality of frames, each of which including a corresponding one of a plurality of second headers and a corresponding one of a plurality of second payloads, each of the plurality of second payloads including a plurality of second marker bits;
receiving the first and second pluralities of frames with a receiver;
determining a delay between an arrival at the receiver of the plurality of first marker bits provided in one of the plurality of first payloads and an arrival at the receiver of the plurality of second marker bits provided in one of the plurality of second payloads;
reconstructing the first and second data streams based on the first and second pluralities of frames, respectively; and
reconstructing the client data based on the delay and the first and second data streams.

13. The method of claim 12, wherein the first data stream and the second data stream have the same data rate.

14. The method of claim 12, wherein the first plurality of frames and the second plurality of frames have the same size and same data rate.

15. The method of claim 12, wherein the plurality of first marker bits form a first bit pattern and the plurality of second marker bits form a second bit pattern.

16. The method of claim 15, wherein the first bit pattern of the plurality of first marker bits and the second bit pattern of the plurality of second marker bits are identical.

17. The method of claim 15, wherein the first bit pattern of the plurality of first marker bits and the second bit pattern of the plurality of second marker bits are not identical.

18. The method of claim 15, wherein the step of generating the first plurality of frames includes periodically inserting the first bit pattern within each of the plurality of first payloads of each of the first plurality of frames at a first time interval, and the step of generating the second plurality of frames includes periodically inserting the second bit pattern within each of the plurality of second payloads of each of the second plurality of frames at a second time interval.

19. The method of claim 18, wherein the first time interval and the second time interval are substantially equal.

20. The method of claim 18, wherein the first bit pattern comprises a first counter value and the step of periodically inserting the first bit pattern includes incrementing the first counter value, the second bit pattern comprises a second counter value and the step of periodically inserting the second bit pattern includes incrementing the second counter value.

* * * * *